(12) United States Patent
Bissett et al.

(10) Patent No.: US 6,205,565 B1
(45) Date of Patent: Mar. 20, 2001

(54) FAULT RESILIENT/FAULT TOLERANT COMPUTING

(75) Inventors: Thomas D. Bissett, Northborough; Martin J. Fitzgerald, V, Medway; Paul A. Leveille, Grafton; James D. McCollum, Whitinsville; Erik Muench, Groveland; Glenn A. Tremblay, Upton, all of MA (US)

(73) Assignee: Marathon Technologies Corporation, Boxboro, MA (US)

( * ) Notice: Subject to any disclaimer, the term of this patent is extended or adjusted under 35 U.S.C. 154(b) by 0 days.

(21) Appl. No.: 09/081,074

(22) Filed: May 19, 1998

Related U.S. Application Data

(62) Division of application No. 08/710,404, filed on Sep. 17, 1996.

(51) Int. Cl.[7] .................................................. G06F 13/00
(52) U.S. Cl. .................................................. 714/49; 714/25
(58) Field of Search ..................... 714/49, 1, 2, 6, 714/7, 8, 10, 11–13, 16, 20, 25, 31, 47, 48, 5, 26, 40; 395/575, 725, 650; 364/184–187

(56) References Cited

U.S. PATENT DOCUMENTS

| | | | |
|---|---|---|---|
| 4,123,794 | 10/1978 | Matsumoto | 364/187 X |
| 4,270,168 | 5/1981 | Murphy et al. | 364/200 |
| 4,356,546 | 10/1982 | Whiteside et al. | 364/200 |
| 4,358,823 | 11/1982 | McDonald et al. | 364/200 |

(List continued on next page.)

FOREIGN PATENT DOCUMENTS

| | | | |
|---|---|---|---|
| 0327083 | 8/1989 | (EP) . | |
| 0372580 | 6/1990 | (EP) . | |
| WO 95/15529 | 6/1995 | (WO) | G06F/15/16 |

OTHER PUBLICATIONS

"Low Cost Device For Contention–Free Barrier Synchronization," IBM Technical Disclosure Bulletin, vol. 31, No. 11, Apr. 1989, Armonk, NY, pp. 382–389.

IMP, Integrated Micro Products, XM–RISC Fault Tolerant Computer System, Oct. 1992.

Siewiorek et al., "Reliable Computer Systems Design and Evaluation", Digital Press 1992, pp. 618–622.

Williams, "New approach allows painless move to fault tolerance", Computer Design, May 1992.

*Primary Examiner*—Nadeem Iqbal
(74) *Attorney, Agent, or Firm*—Fish & Richardson P.C.

(57) ABSTRACT

Data transfer to computing elements is synchronized in a computer system that includes the computing elements and controllers that provide data from data sources to the computing elements. A request for data made by a computing element is intercepted and transmitted to the controllers. At least a first controller responds by transmitting requested data to the computing element and by indicating how a second controller will respond to the intercepted request.

20 Claims, 23 Drawing Sheets

U.S. PATENT DOCUMENTS

| | | | | |
|---|---|---|---|---|
| 4,438,494 | * | 3/1984 | Budde et al. | 364/200 |
| 4,449,182 | | 5/1984 | Rubinson et al. | 364/200 |
| 4,503,535 | * | 3/1985 | Budde et al. | 371/11 |
| 4,531,185 | | 7/1985 | Halpern et al. | 364/200 |
| 4,622,667 | | 11/1986 | Yount | 371/9 |
| 4,634,110 | | 1/1987 | Julich et al. | 371/11 |
| 4,695,945 | | 9/1987 | Irwin | 364/200 |
| 4,812,968 | | 3/1989 | Poole | 364/200 |
| 4,823,256 | | 4/1989 | Bishop et al. | 364/200 |
| 4,847,830 | | 7/1989 | Momirov | 364/187 X |
| 4,907,228 | | 3/1990 | Bruckert et al. | 371/68.3 |
| 4,910,663 | | 3/1990 | Bailey | 364/200 |
| 4,916,704 | | 4/1990 | Bruckert et al. | 371/68.3 |
| 4,920,481 | | 4/1990 | Binkley et al. | 364/200 |
| 4,933,940 | | 6/1990 | Walter et al. | 371/9.1 |
| 4,937,741 | | 6/1990 | Harper et al. | 364/200 |
| 4,965,717 | | 10/1990 | Cutts, Jr. et al. | 364/200 |
| 5,005,174 | | 4/1991 | Bruckert et al. | 371/68.3 |
| 5,048,022 | | 9/1991 | Bissett et al. | 371/40.1 |
| 5,062,042 | | 10/1991 | Binkley et al. | 364/200 |
| 5,088,021 | | 2/1992 | McLaughlin et al. | 364/200 |
| 5,091,847 | | 2/1992 | Herbermann | 395/575 |
| 5,095,423 | | 3/1992 | Gramlich et al. | 395/600 |
| 5,099,485 | | 3/1992 | Bruckert et al. | 371/68.3 |
| 5,142,470 | | 8/1992 | Bristow et al. | 364/187 X |
| 5,146,589 | | 9/1992 | Peet, Jr. et al. | 395/575 |
| 5,157,667 | * | 10/1992 | Carusone, Jr. et al. | 371/29.1 |
| 5,166,674 | | 11/1992 | Baum et al. | 340/825.07 |
| 5,193,175 | | 3/1993 | Cutts, Jr. et al. | 395/575 |
| 5,222,215 | | 6/1993 | Chou et al. | 395/275 |
| 5,226,152 | | 7/1993 | Klug et al. | 395/575 |
| 5,239,641 | | 8/1993 | Horst | 395/550 |
| 5,249,187 | | 9/1993 | Bruckert et al. | 371/68.1 |
| 5,251,312 | | 10/1993 | Sodos | 395/425 |
| 5,255,367 | | 10/1993 | Bruckert et al. | 395/200 |
| 5,261,092 | | 11/1993 | McLaughlin et al. | 395/600 |
| 5,276,823 | | 1/1994 | Cutts, Jr. et al. | 395/575 |
| 5,280,621 | | 1/1994 | Barnes et al. | 395/800 |
| 5,295,258 | * | 3/1994 | Jewett et al. | 395/575 |
| 5,317,726 | | 5/1994 | Horst | 395/575 |
| 5,327,553 | | 7/1994 | Jewett et al. | 395/575 |
| 5,339,404 | | 8/1994 | Vandling, III | 395/575 |
| 5,367,639 | | 11/1994 | Sodos | 395/275 |
| 5,390,326 | * | 2/1995 | Shah | 395/575 |
| 5,398,331 | | 3/1995 | Huang et al. | 395/575 |
| 5,423,025 | * | 6/1995 | Goldman et al. | 395/575 |
| 5,448,722 | | 9/1995 | Lynne et al. | 395/650 |
| 5,491,625 | | 2/1996 | Pressnall et al. | 364/187 X |
| 5,555,372 | | 9/1996 | Tetreault et al. | 395/182.13 |
| 5,790,397 | * | 8/1998 | Bissett et al. | 364/131 |
| 5,923,840 | * | 7/1999 | Desnoyers et al. | 395/185.01 |
| 5,968,189 | * | 10/1999 | Desnoyers et al. | 714/47 |

\* cited by examiner

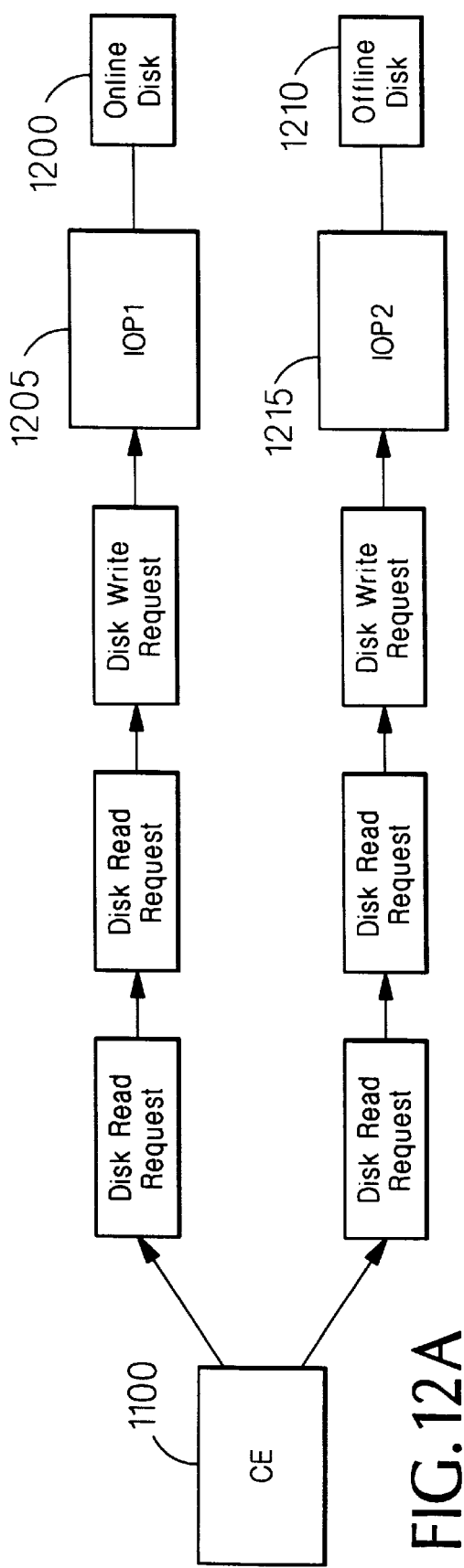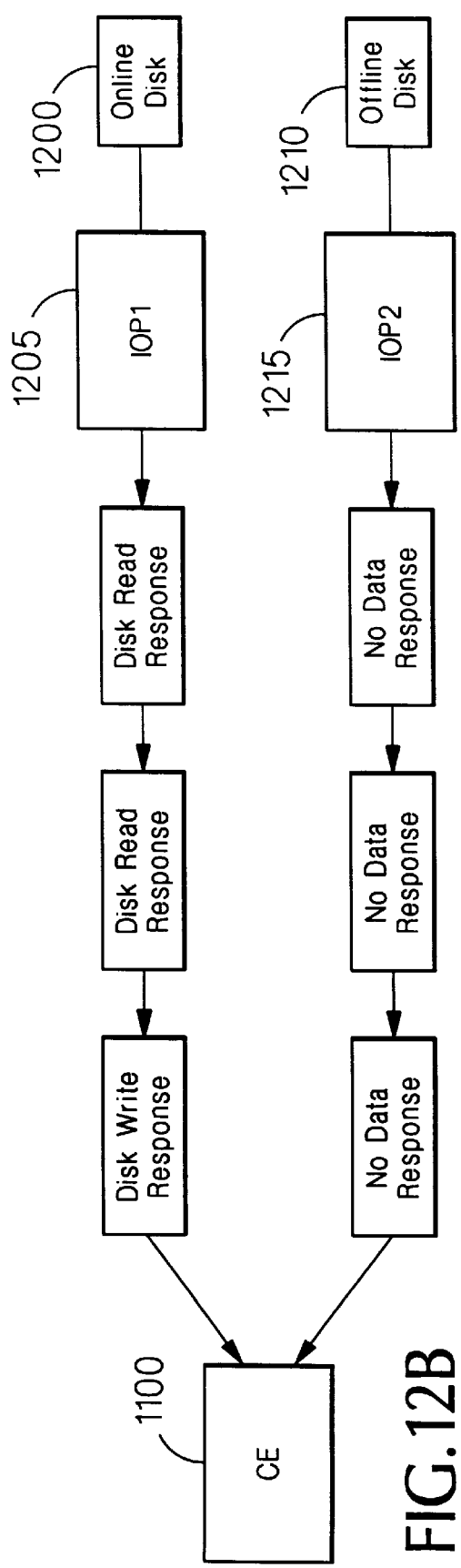
FIG. 12A
FIG. 12B

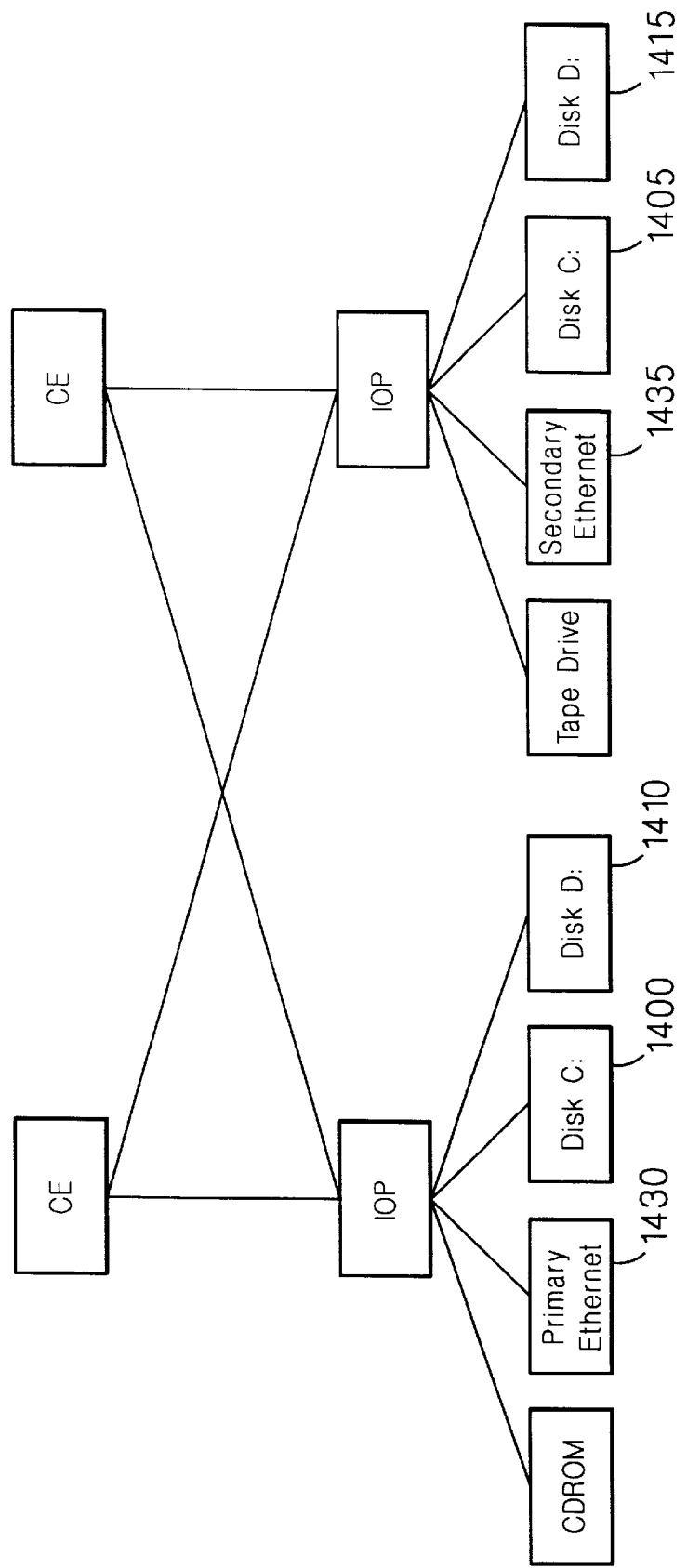
FIG.14A Physical Configuration

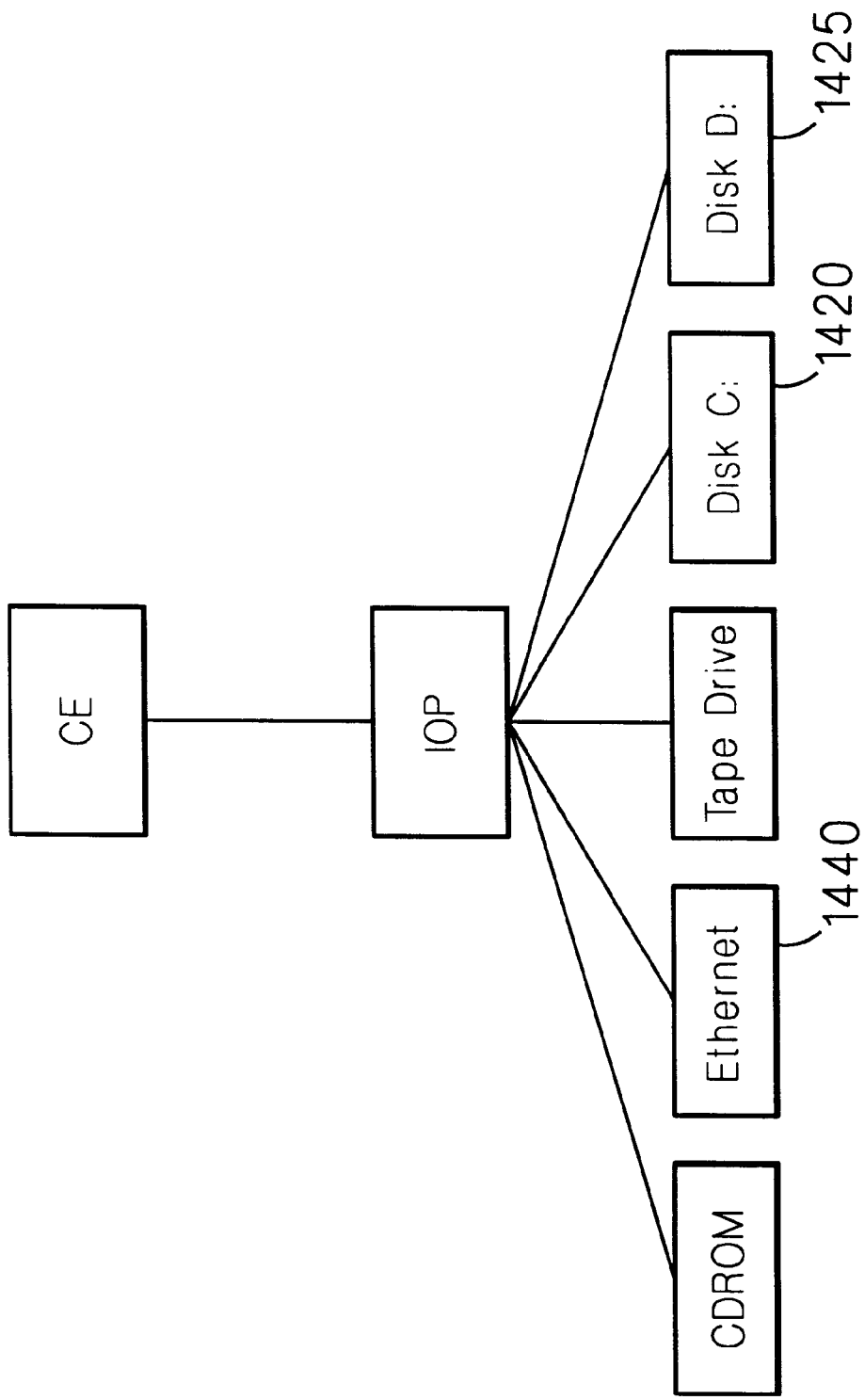
FIG. 14B Logical Configuration

| CURRENT STATE | NEW STATE | | | | | | |
|---|---|---|---|---|---|---|---|
| | IDLE | REQ_SND | RSP_WAIT | DREQ_SND | DRSP_WAIT | REL_SND | RSP_TMO |
| IDLE | | CEX Entry | | | | | |
| REQ_SND | | Send retry | Req sent | | | | |
| RSP_WAIT | | | Another Rsp | All rsp rcvd | | | Rsp timeout |
| DREQ_SND | | | | Send retry | DReq sent | | |
| DRSP_WAIT | | | | | Another | All DRsp | DRsp |
| REL_SND | Rel sent | | | | | Sent retry | |
| RSP_TMO | IPI Reset | | | Port state | | | Port state chg |

FIG.16A

| CURRENT STATE | NEW STATE | | | | | | |
|---|---|---|---|---|---|---|---|
| | IDLE | REQ_WAIT | RSP_SND | REL_WAIT | DRSP_SND | DREL_WAIT | REL_TMO |
| IDLE | IPI Reset | Rcv rcvd | | | | | |
| REQ_WAIT | | Another Req | All Req rcvd | | | | |
| RSP_SND | | | Send retry | Rsp sent | | | |
| REL_WAIT | All Rel rcvd | | | Another Rel | | | Rel timeout |
| DRSP_SND | | | | | DReq rcvd | | |
| DREL_WAIT | All DRel | | | | Send retry | Another DRel | DRel timeout |
| REL_TMO | IPI Reset, or | | | port state chg | | | Port state chg |

FIG.16B

| # | Syndrome | | | |
|---|---|---|---|---|
| | Error | Path | Received from | Callouts |
| 1 | NAK | M1→M2 | M1 | M1→M2 Interconnect |
| | NAK (echoed) | M1→M2 | M1 (echoed by M2) | M1 Interconnect Adapter Transmitter |
| | EDC | M1→M2 | M2 | M2 Interconnect Adapter Receiver |
| 2 | NAK (echoed) | M1→M2 | M1 (via M2 echo) | M1→M2 Interconnect |
| | EDC | M1→M2 | M2 | |

FIG.19A

Initial state

NAK(M1→M2, M1) → NAK(M1→M2, M1 v. M2) → EDC(M1→M2, M2) → Syndrome 1 Callouts
→ EDC(M1→M2, M2) → NAK(M1→M2, M1 v. M2) → Syndrome 1 Callouts NAK(M1→M2, M1 v. M2) → NAK(M1→M2, M1) → EDC(M1→M2, M2) → Syndrome 1 Callouts
→ EDC(M1→M2, M2) → NAK(M1→M2, M1) → Syndrome 1 Callouts
→ Syndrome 2 Callouts EDC(M1→M2, M2) → NAK(M1→M2, M1) → NAK(M1→M2, M1 v. M2) → Syndrome 1 Callouts
→ NAK(M1→M2, M1 v. M2) → NAK(M1→M2, M1) → Syndrome 1 Callouts
→ Syndrome 2 Callouts

FIG.19B

| List 1 | List2 |
|---|---|
| Machine 1 Power | Machine 2 Power |
| Machine 1 Interconnect Adapter | Machine 2 Interconnect Adapter |
| Machine 1→Machine 2 Unidirectional InterCnx | Machine 2→Machine 1 Unidirectional InterCnx |

FIG. 21A

| List 1 Element | List 2 Element | Product |
|---|---|---|
| Machine 1 Power | Machine 2 Power | Common Machine 1/2 Power Supply |
| Machine 1 Power | Machine 2 Adapter | Common Machine 1/2 Power Supply |
| Machine 1 Power | 2→1 Interconnect | Machine 1 Power |
| Machine 1 Adapter | Machine 2 Power | Common Machine 1/2 Power Supply |
| Machine 1 Adapter | Machine 2 Adapter | Common Machine 1/2 Power Supply |
| Machine 1 Adapter | 2→1 Interconnect | Machine 1 Adapter |
| 1→2 Interconnect | Machine 2 Power | Machine 2 Power |
| 1→2 Interconnect | Machine 2 Adapter | Machine 2 Adapter |
| 1→2 Interconnect | 2→1 Interconnect | 1↔2 Bidirectional Interconnect |

FIG. 21B

| Callout | Rank |
|---|---|
| Common machine 1/2 Power Supply | 5 |
| Machine 1 Power | 4 |
| Machine 2 Power | 4 |
| Machine 1 Adapter | 3 |
| Machine 2 Adapter | 3 |
| Machine 1 ↔ Machine 2 Bidirectional Interconnect | 2 |
| Machine 1 → Machine 2 Unidirectional Interconnect | 1 |
| Machine 1 → Machine 1 Unidirectional Interconnect | 1 |

FIG. 22

FAULT RESILIENT/FAULT TOLERANT COMPUTING

This application is a div of Ser. No. 08/710,404 filed Sep. 17, 1996.

BACKGROUND OF THE INVENTION

The invention relates to fault resilient and fault tolerant computing.

Fault resilient computer systems can continue to function in the presence of hardware failures. These systems operate in either an availability mode or an integrity mode, but not both. A system is "available" when a hardware failure does not cause unacceptable delays in user access. Accordingly, a system operating in an availability mode is configured to remain online, if possible, when faced with a hardware error. A system has data integrity when a hardware failure causes no data loss or corruption. Accordingly, a system operating in an integrity mode is configured to avoid data loss or corruption, even if the system must go offline to do so.

Fault tolerant systems stress both availability and integrity. A fault tolerant system remains available and retains data integrity when faced with a single hardware failure, and, under some circumstances, when faced with multiple hardware failures.

Disaster tolerant systems go one step beyond fault tolerant systems and require that loss of a computing site due to a natural or man-made disaster will not interrupt system availability or corrupt or lose data.

Typically, fault resilient/fault tolerant systems include several processors that may function as computing elements or controllers, or may serve other roles. In many instances, it is important to synchronize operation of the processors or the transmission of data between the processors.

SUMMARY OF THE INVENTION

In one aspect, generally, the invention features synchronizing data transfer to a computing element in a computer system including the computing element and controllers that provide data from data sources to the computing element. A request for data made by the computing element is intercepted and transmitted to the controllers. Controllers respond to the request and at least one controller responds by transmitting requested data to the computing element and by indicating how another controller will respond to the intercepted request.

Embodiments of the invention may include one or more of the following features. A controller may respond to the intercepted request by indicating that the controller has no data corresponding to the intercepted request and by indicating that another controller will respond to the intercepted request by transmitting data to the computing element. Each response to the intercepted request by a controller may include an indication as to how each other controller will respond to the intercepted request.

The computing element may compare the responses to the intercepted request for consistency. When each response includes an indication as to how each other controller will respond to the intercepted request, the comparison may include comparing the indications for consistency. When responses of two or more controllers include requested data, the comparison may include comparing the data for consistency. The computing element may notify the controllers of the outcome of the comparison and that responses have been received from all of the controllers.

A controller may be disabled when the responses are not consistent. In addition, an error condition may be generated if the computing element does not receive responses from all of the controllers within a predetermined time period.

A data source may be associated with a controller, and the controller may obtain the requested data from the data source in response to the intercepted request.

A controller may maintain a record of a status of another controller, and may use the record when indicating how the other controller will respond to the intercepted request. When a data source is associated with the other controller, the record may include the status of the data source. Each controller may maintain records of statuses of all other controllers and may use the records to indicate how the other controllers will respond to the intercepted request. When each controller is associated with a data source, each controller may maintain records of statuses of data sources associated with all other controllers.

When a status of a data source associated with a controller changes, the controller may transmit to the computing element an instruction to discard responses from other controllers to the intercepted request. The computing element may respond to the instruction by discarding responses from other controllers to the intercepted request and by transmitting to the controllers a notification that the responses have been discarded. A controller may respond to the notification by updating a record of the status of the data source. After updating the record, the controller may retransmit the requested data to the computing element and indicate how the other controller will respond to the intercepted request.

When a data source is associated with each controller, each controller may respond to the intercepted request by determining whether an associated data source is expected to process the request, and when the associated data source is expected to process the request, transmitting the request to the associated data source, receiving results of the request from the associated data source, and forwarding the results of the request to the computing element. When the associated data source is not expected to process the request, the controller may respond by informing the computing element that no data will be provided in response to the request.

In another aspect, generally, the invention features maintaining synchronization between computing elements processing identical instruction streams in a computer system including the computing elements and controllers that provide data from data sources to the computing elements, with the controllers operating asynchronously to the computing element. Computing elements processing identical instruction streams each stop processing of the instruction stream at a common point in the instruction stream. Each computing element then generates a freeze request message and transmits the freeze request message to the controllers. A controller receives a freeze request message from a computing element, waits for a freeze request message from other computing elements, and, upon receiving a freeze request message from each computing element processing an identical instruction stream, generates a freeze response message and transmits the freeze response message to the computing elements. Each computing element, upon receiving a freeze response message from a controller, waits for freeze response messages from other controllers to which a freeze request message was transmitted, and, upon receiving a freeze response message from each controller, generates a freeze release message, transmits the freeze release message to the controllers, and resumes processing of the instruction stream.

Embodiments of the invention may include one or more of the following features. The common point in the instruction stream may correspond to an I/O operation, the occurrence of a predetermined number of instructions without an I/O operation, or both.

A controller may include a time update in the freeze response message, and a computing element, upon receiving a freeze response message from each controller to which a freeze request message was transmitted, may update a system time using the time update from a freeze response message. The computing element may use the time update from a freeze response message generated by a particular controller.

Upon receiving a freeze response message from each controller to which a freeze request message was transmitted, a computing element may process data received from a controller prior to receipt of freeze response messages from the controllers.

In another aspect, generally, the invention features handling faults in a computer system including error reporting elements and error processing elements. An error reporting element detects an error condition and transmits information about the error condition as an error message to error processing elements connected to the error reporting element. At least one error processing element retransmits the error message to other error processing elements connected to the error processing element.

In another aspect, generally, the invention features handling faults in a computer system including error reporting elements and error processing elements. Error reporting element detect an error condition and transmit information about the error condition as error messages to error processing elements connected to the error reporting elements. At least one error processing element combines information from related error messages from multiple error reporting elements and uses the combined information in identifying a source of the error condition.

The error processing element may use a state table to combine information from related error messages. The error processing element may represent an error message using an error identifier that identifies a particular error, an error target that identifies a subcomponent that caused the error represented by the error message, and a reporting source that identifies an error reporting element that generated the error message and a path over which the error message was received. The error processing element may determine whether error messages are related by comparing a received error message against states representing previously received error messages.

Other features and advantages will become apparent from the following description, including the drawings, and from the claims.

BRIEF DESCRIPTION OF THE DRAWINGS

FIGS. 12A and 12B are flow diagrams illustrating information transferred between CEs and IOPs.

FIGS. 14A and 14B are block diagrams illustrating physical and logical system configurations.

FIGS. 16A and 16B are tables of microcode state transitions.

FIG. 19A is a syndrome source table.

FIG. 19B is a state transition table corresponding to the syndrome source table of FIG. 19A.

FIGS. 21A, 21B and 22 are tables listing callout elements.

DESCRIPTION OF THE PREFERRED EMBODIMENTS

Figure 1:
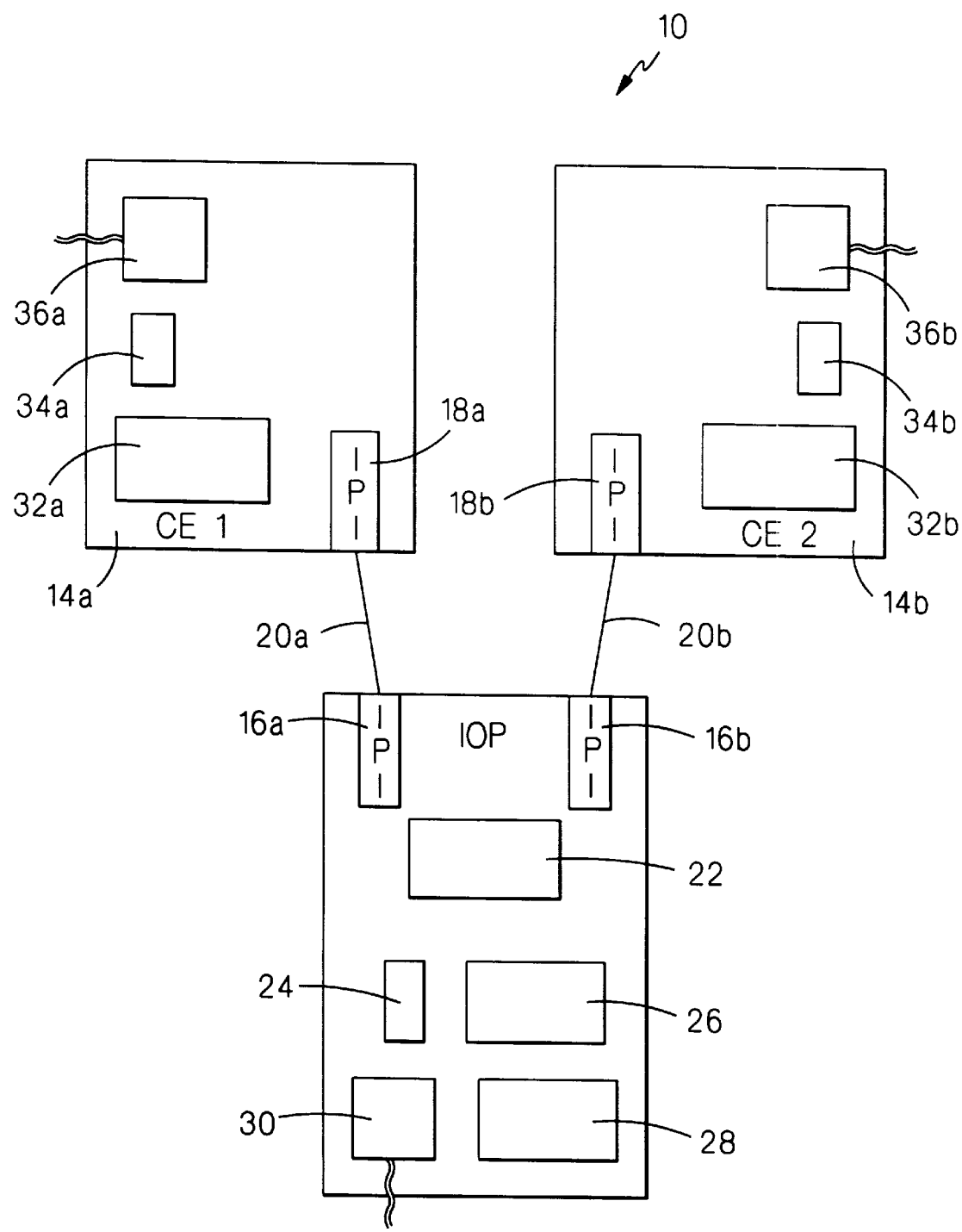
FIG. 1 is a block diagram of a partially fault resilient system.

FIG. 1 illustrates a fault resilient system 10 that includes an I/O processor ("IOP") 12 and two computing elements ("CEs") 14a, 14b (collectively referred to as CEs 14). System 10 includes only a single IOP 12 and therefore cannot recover from a failure in IOP 12. As such, system 10 is not entirely fault resilient.

IOP 12 includes two inter-processor interconnect ("IPI") modules 16a, 16b that are connected, respectively, to corresponding IPI modules 18a, 18b of CEs 14 by cables 20a, 20b. IOP 12 also includes a processor 22, a memory system 24, two hard disk drives 26, 28, and a power supply 30. Similarly, each CE 14 includes a processor 32, a memory system 34, and a power supply 36. Separate power supplies 36 are used to ensure fault resilience in the event of a power supply failure. Processors 32a, 32b are "identical" to each other in that, for every instruction, the number of cycles required for processor 32a to perform an instruction is identical to the number of cycles required for processor 32b to perform the same instruction. In the illustrated embodiment, system 10 has been implemented using standard Intel 486 based motherboards for processors 22, 32 and four megabytes of memory for each of memory systems 24, 34.

IOP 12 and CEs 14 of system 10 run unmodified operating system and applications software, with hard drive 26 being used as the boot disk for the IOP and hard drive 28 being used as the boot disk for CEs 14. In truly fault resilient or fault tolerant systems that include at least two IOPS, each hard drive would also be duplicated.

In the illustrated embodiment, the operating system for IOP 12 and CEs 14 is DOS. However, other operating systems can also be used. Moreover, IOP 12 can run a different operating system from the one run by CEs 14. For example, IOP 12 could run Unix while CEs 14 run DOS. This approach is advantageous because it allows CEs 14 to access peripherals from operating systems that do not support the peripherals. For example, if CEs 14 were running an operating system that did not support CD-ROM drives, and IOP 12 were running one that did, CEs 14 could access the CD-ROM drive by issuing I/O requests identical to those used to, for example, access a hard drive. IOP 12 would then handle the translation of the I/O request to one suitable for accessing the CD-ROM drive.

Figure 2:
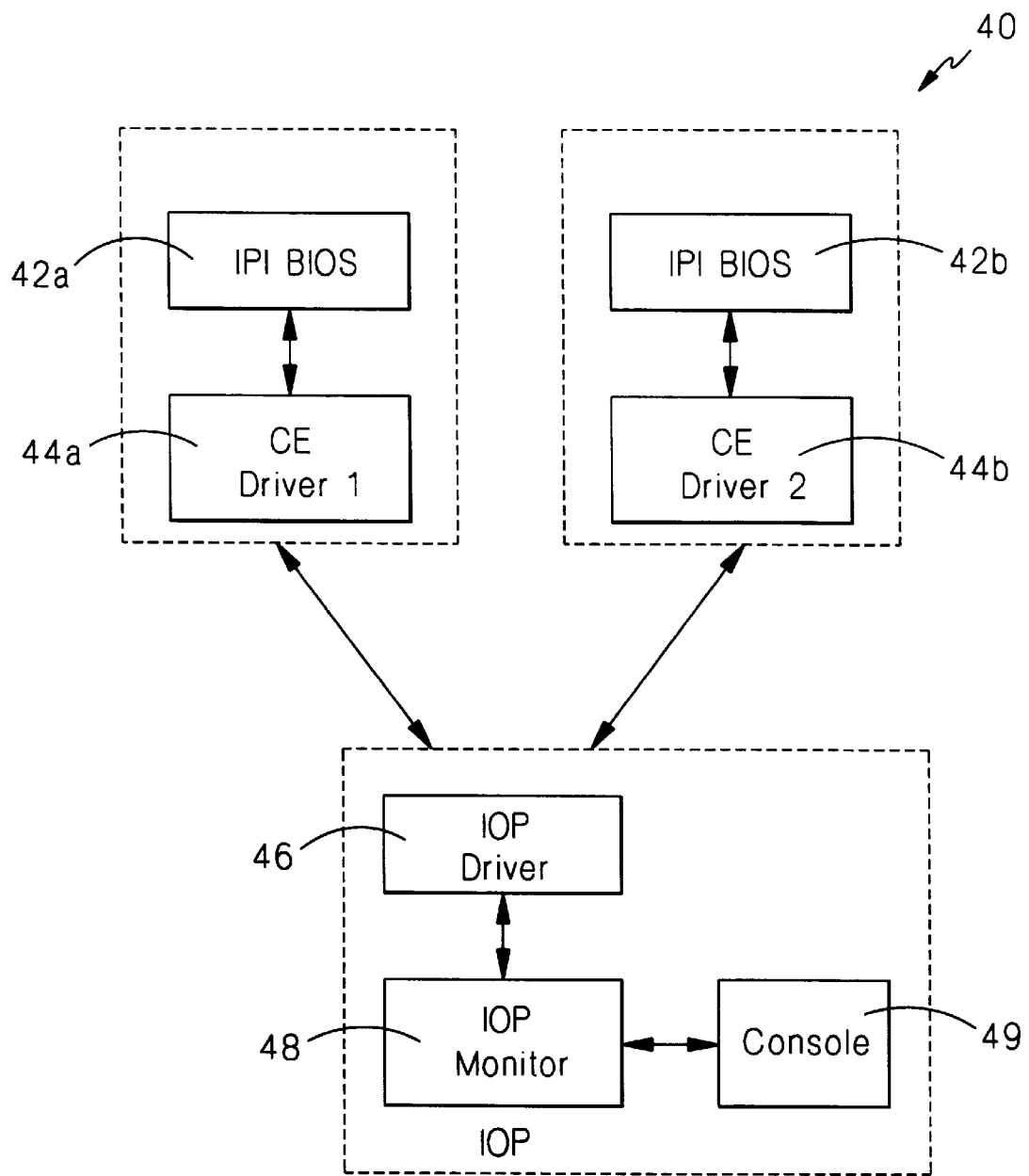
FIG. 2 is a block diagram of system software of the system of FIG. 1.

FIG. 2 provides an overview of specialized system software 40 used by system 10 to control the booting and synchronization of CEs 14, to disable local time in CEs 14, to redirect all I/O requests from CEs 14 to IOP 12 for execution, and to return the results of the I/O requests, if any, from IOP 12 to CEs 14.

System software 40 includes two sets of IPI BIOS 42 that are ROM-based and are each located in the IPI module 18 of a CE 14. IPI BIOS 42 are used in bootup and synchronization activities. When a CE 14 is booted, IPI BIOS 42 replaces the I/O interrupt addresses in the system BIOS interrupt table with addresses that are controlled by CE Drivers 44. The interrupt addresses that are replaced include those corresponding to video services, fixed disk services, serial communications services, keyboard services, and time of day services.

CE Drivers 44 are stored on CE boot disk 28 and are run by CEs 14. CE Drivers 44 intercept I/O requests to the system BIOS and redirect them through IPI modules 18 to IOP 12 for execution. CE Drivers 44 also respond to interrupt requests from IPI modules 18, disable the system clock, and, based on information supplied by IOP Monitor 48, control the time of day of CEs 14.

An IOP Driver 46 that is located on IOP boot disk 26 and is run by IOP 12 handles I/O requests from CEs 14 by redirecting them to an IOP Monitor 48 for processing. Thereafter, IOP Driver 46 transmits the results of the requests from IOP Monitor 48 to CEs 14. IOP Driver 46 communicates with CE drivers 44 using a packet protocol.

IOP Monitor 48 is located on IOP boot disk 26 and is run by IOP 12. IOP Monitor 48 controls system 10 and performs the actual I/O requests to produce the results that are transmitted by IOP Driver 46 to CEs 14.

System software 40 also includes console software 49 that runs on IOP 12 and permits user control of system 10. Using console software 49, a user can reset, boot, or synchronize a CE 14. The user can also set one or both of CEs 14 to automatically boot (autoboot) and/or automatically synchronize (autosync) after being reset or upon startup. The ability to control each CE 14 is useful both during normal operation and for test purposes. Using console software 49, the user can also place system 10 into either an integrity mode in which IOP Monitor 48 shuts down both CEs 14 when faced with a miscompare error, a first availability mode in which IOP Monitor 48 disables CE 14a when faced with a miscompare error, or a second availability mode in which IOP Monitor 48 disables CE 14b when faced with a miscompare error. Finally, console software 49 allows the user to request the status of system 10. In an alternative embodiment, console software 49 is implemented using a separate processor that communicates with IOP 12.

Each CE 14 runs a copy of the same application and the same operating system as that run by the other CE 14. Moreover, the contents of memory systems 34a and 34b are the same, and the operating context of CEs 14 are the same at each synchronization time. Thus, IOP Monitor 48 should receive identical sequences of I/O requests from CEs 14.

Figure 3:
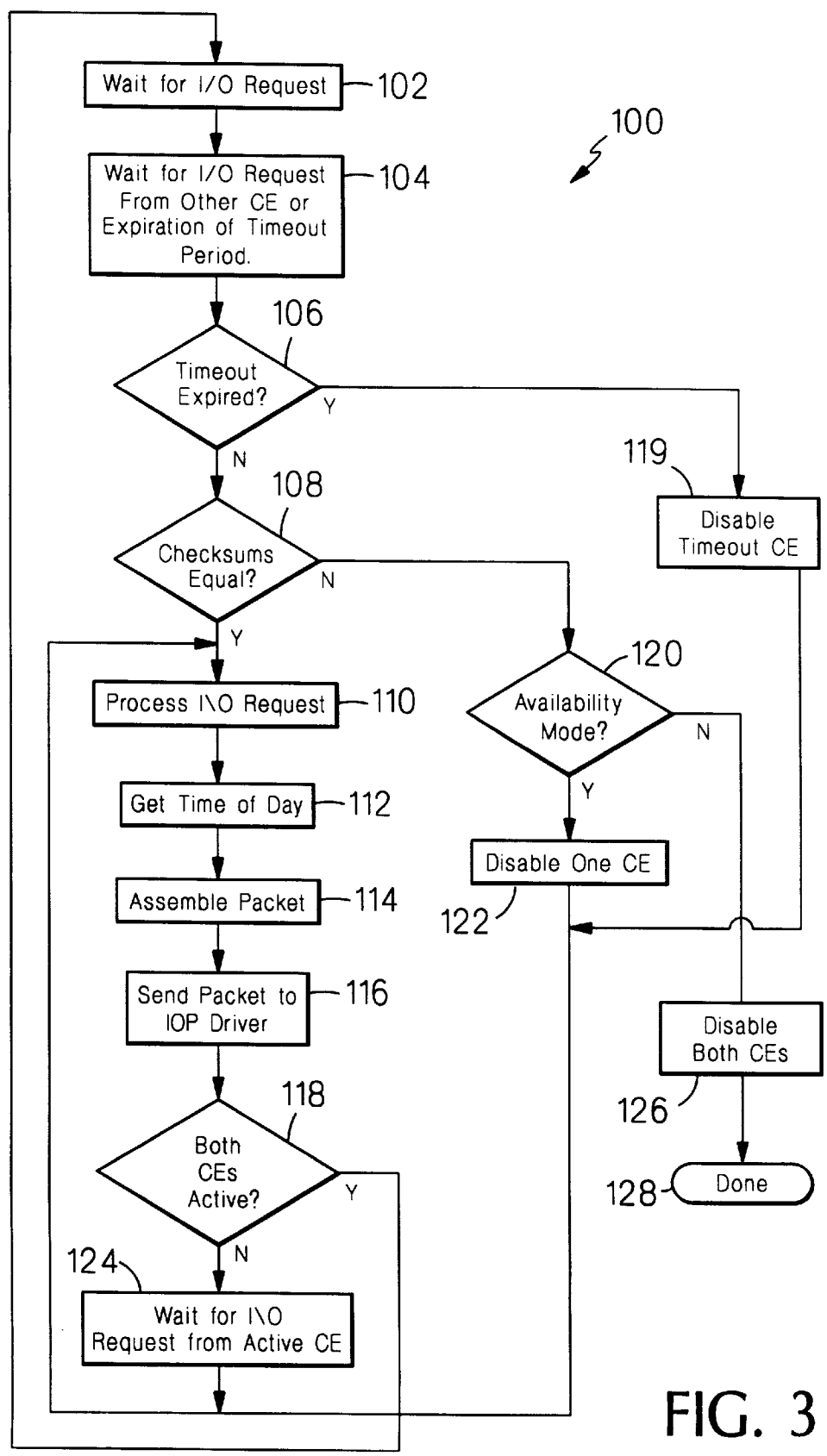
FIG. 3 is a flowchart of a procedure used by an IOP Monitor of the system software of FIG. 2.

As shown in FIG. 3, IOP Monitor 48 processes and monitors I/O requests according to a procedure 100.

Initially, IOP Monitor 48 waits for an I/O request from one of CEs 14 (step 102). Upon receiving an I/O request packet from, for example, CE 14b, IOP Monitor 48 waits for either an I/O request from CE 14a or for the expiration of a timeout period (step 104). Because system 10 uses the DOS operating system, which halts execution of an application while an I/O request is being processed, IOP Monitor 48 is guaranteed not to receive an I/O request from CE 14b while waiting (step 104) for the I/O request from the CE 14a.

Next, IOP Monitor 48 checks to determine whether the timeout period has expired (step 106). If not (that is, if an I/O request packet from CE 14a has arrived), IOP Monitor 48 compares the checksums of the packets (step 108). If the checksums are equal, IOP Monitor 48 processes the I/O request (step 110). After processing the I/O request, IOP Monitor 48 issues a request to the system BIOS of IOP 12 for the current time of day (step 112).

After receiving the time of day, IOP Monitor 48 assembles an IPI packet that includes the time of day and the results, if any, of the I/O request (step 114) and sends the IPI packet to IOP Driver 46 (step 116) for transmission to CEs 14. When CEs 14 receive the IPI packet, they use the transmitted time of day to update their local clocks which, as already noted, are otherwise disabled.

As required by DOS, execution in CEs 14 is suspended until IOP Monitor 48 returns the results of the I/O request through IOP Driver 46. Before execution is resumed, the times of day of both CEs 14 are updated to a common value corresponding to the transmitted time of day from the IPI packet. Accordingly, the CEs 14 are kept in time synchronization. The transmitted time of day is designated as the meta time. If a multitasking operating system were employed, execution in CEs 14 would not be suspended while IOP Monitor 48 performed the I/O request. Instead, processing in CEs 14 would be suspended only until receipt of an acknowledgement indicating that IOP Monitor 48 had begun processing the I/O request (step 110). The acknowledgement would include the time of day and would be used by CEs 14 to update the local clocks.

After sending the IPI packet to IOP Driver 46, IOP Monitor 48 verifies that both CEs 14 are online (step 118), and, if so, waits for an I/O request from one of the CEs 14 (step 102).

If the timeout period has expired (step 106), IOP Monitor 48 disables the CE 14 that failed to respond (step 119) and processes the I/O request (step 110).

If there is a miscompare between the checksums of the packets from CEs 14 (step 108), IOP Monitor 48 checks to see if system 10 is operating in an availability mode or an integrity mode (step 120). If system 10 is operating in an availability mode, IOP Monitor 48 disables the appropriate CE 14 based on the selected availability mode (step 122), and processes the I/O request (steps 110–116). Thereafter, IOP Monitor 48 determines whether the disabled CE 14 has been repaired and reactivated (step 118). If not, IOP Monitor 48 waits for an I/O request from the online CE 14 (step 124). With one of the CEs 14 disabled, system 10 is no longer fault resilient and IOP Monitor 48 immediately processes a received I/O request (step 110).

If system 10 is operating in an integrity mode when a miscompare is detected, IOP Monitor 48 disables both CEs 14 (step 126) and stops processing (step 128).

Referring again to FIGS. 1 and 2, when the application or the operating system of, for example, CE 14a makes a non-I/O call to the system BIOS, the system BIOS executes the request and returns the results to the application without invoking system software 40. However, if the application or the operating system makes an I/O BIOS call, CE Driver 44a intercepts the I/O request. After intercepting the I/O request, CE Driver 44a packages the I/O request into an IPI packet and transmits the IPI packet to IOP 12.

When IPI module 16a of IOP 12 detects transmission of an IPI packet from CE 14a, IPI module 16a generates an interrupt to IOP Driver 46. IOP Driver 46 then reads the IPI packet.

As discussed above, IOP Monitor 48 responds to the IPI packet from CE 14a according to procedure 100. As also discussed, assuming that there are no hardware faults, IOP Driver 46 eventually transmits an IPI packet that contains the results of the I/O request and the time of day to CEs 14.

IPI modules 18 of CEs 14 receive the IPI packet from IOP 12. CE Drivers 44 unpack the IPI packet, update the time of day of CEs 14, and return control of CEs 14 to the application or the operating system running on CEs 14.

If no I/O requests are issued within a given time interval, the IPI module 18 of a CE 14 generates a so-called quantum interrupt that invokes the CE Driver 44 of the CE 14. In response, the CE Driver 44 creates a quantum interrupt IPI packet and transmits it to IOP 12. IOP Monitor 48 treats the quantum interrupt IPI packet as an IPI packet without an I/O request. Thus, IOP Monitor 48 detects the incoming quantum interrupt IPI packet (step 102 of FIG. 3) and, if a matching quantum interrupt IPI packet is received from the other CE 14 (steps 104, 106, and 108 of FIG. 3), issues a request to the system BIOS of IOP 12 for the current time of day (step 112 of FIG. 3). IOP Monitor 48 then packages the current time of day into a quantum response IPI packet (step 114 of FIG. 3) that IOP Driver 46 then sends to CEs 14 (step 116 of FIG. 3). CE Drivers 44 respond to the quantum response IPI packet by updating the time of day and returning control of CEs 14 to the application or the operating system running on CEs 14.

If IOP Monitor 48 does not receive a quantum interrupt IPI package from the other CE 14 within a predefined timeout period (step 106 of FIG. 3), IOP Monitor 48 responds by disabling the non-responding CE 14.

As shown in FIG. 1, IPI modules 16, 18 and cables 20 provide all of the hardware necessary to produce a fault resilient system from the standard Intel 486 based motherboards used to implement processors 22, 32. An IPI module 16 and an IPI module 18, which are implemented using identical boards, each perform similar functions.

Figure 4:
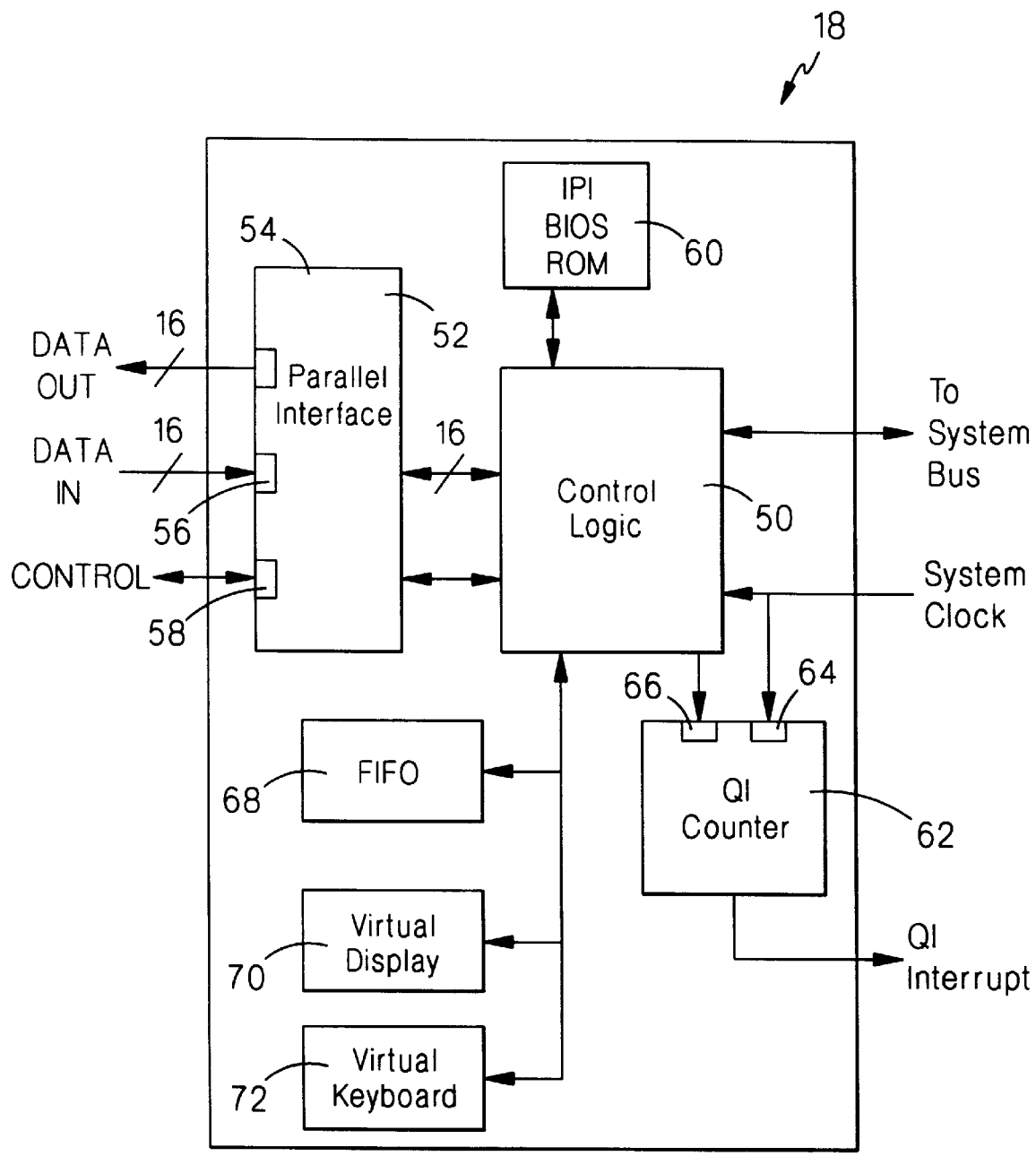
FIG. 4 is a block diagram of an IPI module of the system of FIG. 1.

As illustrated in FIG. 4, an IPI module 18 includes a control logic 50 that communicates I/O requests and responses between the system bus of a processor 32 of a CE 14 and a parallel interface 52 of IPI module 18. Parallel interface 52, in turn, communicates with the parallel interface of an IPI module 16 through a cable 20. Parallel interface 52 includes a sixteen bit data output port 54, a sixteen bit data input port 56, and a control port 58. Cable 20 is configured so that data output port 54 is connected to the data input port of the IPI module 16, data input port 56 is connected to the data output port of the IPI module 16, and control port 58 is connected to the control port of the IPI module 16. Control port 58 implements a handshaking protocol between IPI module 18 and the IPI module 16.

Control logic 50 is also connected to an IPI BIOS ROM 60. At startup, control logic 50 transfers IPI BIOS 42 (FIG. 2), the contents of IPI BIOS ROM 60, to processor 32 through the system bus of processor 32.

A QI counter 62, also located on IPI module 18, generates quantum interrupts as discussed above. QI counter 62 includes a clock input 64 that is connected to the system clock of processor 32 and a gate input 66 that is connected to control logic 50. Gate input 66 is used to activate and reset the counter value of QI counter 62. When activated, QI counter 62 decrements the counter value by one during each cycle of the system clock of processor 32. When the counter value reaches zero, QI counter 62 generates a quantum interrupt that, as discussed above, activates CE Driver 44 (FIG. 2).

CE Driver 44 deactivates QI counter 62 at the beginning of each I/O transaction. CE Driver 44 deactivates QI counter 62 by requesting an I/O write at a first address, known as the QI deactivation address. Control logic 50 detects the I/O write request and deactivates QI counter 62 through gate input 66. Because this particular I/O write is for control purposes only, control logic 50 does not pass the I/O write to parallel interface 52. At the conclusion of each I/O transaction, CE Driver 44 resets and activates QI counter 62 by requesting an I/O write to a second address, known as the QI activation address. Control logic 50 responds by resetting and activating QI counter 62.

In an alternative approach, quantum interrupts are generated through use of debugging or other features available in processor 32. Some commonly available processors include debugging or trap instructions that trap errors by transferring control of the processor to a designated program after the completion of a selected number of instructions following the trap instruction. In this approach, each time that CE Driver 44 returns control of processor 32 to the application or operating system, CE Driver 44 issues a trap instruction to indicate that control of processor 32 should be given to CE Driver 44 upon completion of, for example, 300 instructions. After processor 32 completes the indicated 300 instructions, the trap instruction causes control of processor 32 to be returned to CE Driver 44. In the event that an I/O request activates CE Driver 44 prior to completion of the indicated number of instructions, CE Driver 44 issues an instruction that cancels the trap instruction.

IPI Module 18 is also used in activating an offline CE 14. As discussed below, before an offline CE 14 is activated, the contents of the memory system 34 of the active CE 14 are copied into the memory system 34 of the offline CE 14. To minimize the effects of this copying on the active CE 14, the processor 32 of the active CE 14 is permitted to continue processing and the memory is copied only during cycles in which the system bus of the processor 32 of the active CE 14 is not in use.

To enable processor 32 to continue processing while the memory is being copied, IPI module 18 accounts for memory writes by the processor 32 to addresses that have already been copied to the offline CE 14. To do so, control logic 50 monitors the system bus and, when the processor 32 writes to a memory address that has already been copied, stores the address in a FIFO 68. When the memory transfer is complete, or when FIFO 68 is full, the contents of memory locations associated with the memory addresses stored in FIFO 68 are copied to the offline CE 14 and FIFO 68 is emptied. In other approaches, FIFO 68 is modified to store both memory addresses and the contents of memory locations associated with the addresses, or to store the block addresses of memory blocks to which memory addresses being written belong.

IPI module 18 also handles non-BIOS I/O requests. In some computer systems, the BIOS is too slow to effectively perform I/O operations such as video display. As a result, some less structured or less disciplined operating systems, such as DOS or UNIX, allow applications to circumvent the BIOS and make non-BIOS I/O requests by directly reading from or writing to the addresses associated with I/O devices. These non-BIOS I/O requests, which cannot be intercepted by changing the system interrupt table, as is done in connection with, for example, I/O disk reads and writes, are problematic for a system in which synchronization requires tight control of the I/O interface.

To remedy this problem, and to assure that even non-BIOS I/O requests can be isolated and managed by IOP 12, IPI module 18 includes virtual I/O devices that mimic the hardware interfaces of physical I/O devices. These virtual I/O devices include a virtual display 70 and a virtual keyboard 72. As needed, other virtual I/O devices such as a virtual mouse or virtual serial and parallel ports could also be used.

In practice, control logic 50 monitors the system bus for read or write operations directed to addresses associated with non-BIOS I/O requests to system I/O devices. When control logic 50 detects such an operation, control logic 50 stores the information necessary to reconstruct the operation in the appropriate virtual device. Thus, for example, when control logic 50 detects a write operation directed to an address associated with the display, control logic 50 stores the information necessary to reconstruct the operation in virtual display 70. Each time that a BIOS I/O request or a quantum interrupt occurs, CE Driver 44 scans the virtual I/O devices and, if the virtual devices are not empty, assembles the information stored in the virtual devices into an IPI packet and transmits the IPI packet to IOP 12. IOP 12 treats the packet like a BIOS I/O request using procedure 100 discussed above. When control logic 50 detects a read addressed to a virtual I/O device, control logic 50 assembles the read request into an IPI packet for handling by IOP 12. IOP 12 treats the IPI packet like a standard BIOS I/O request.

Figure 5:
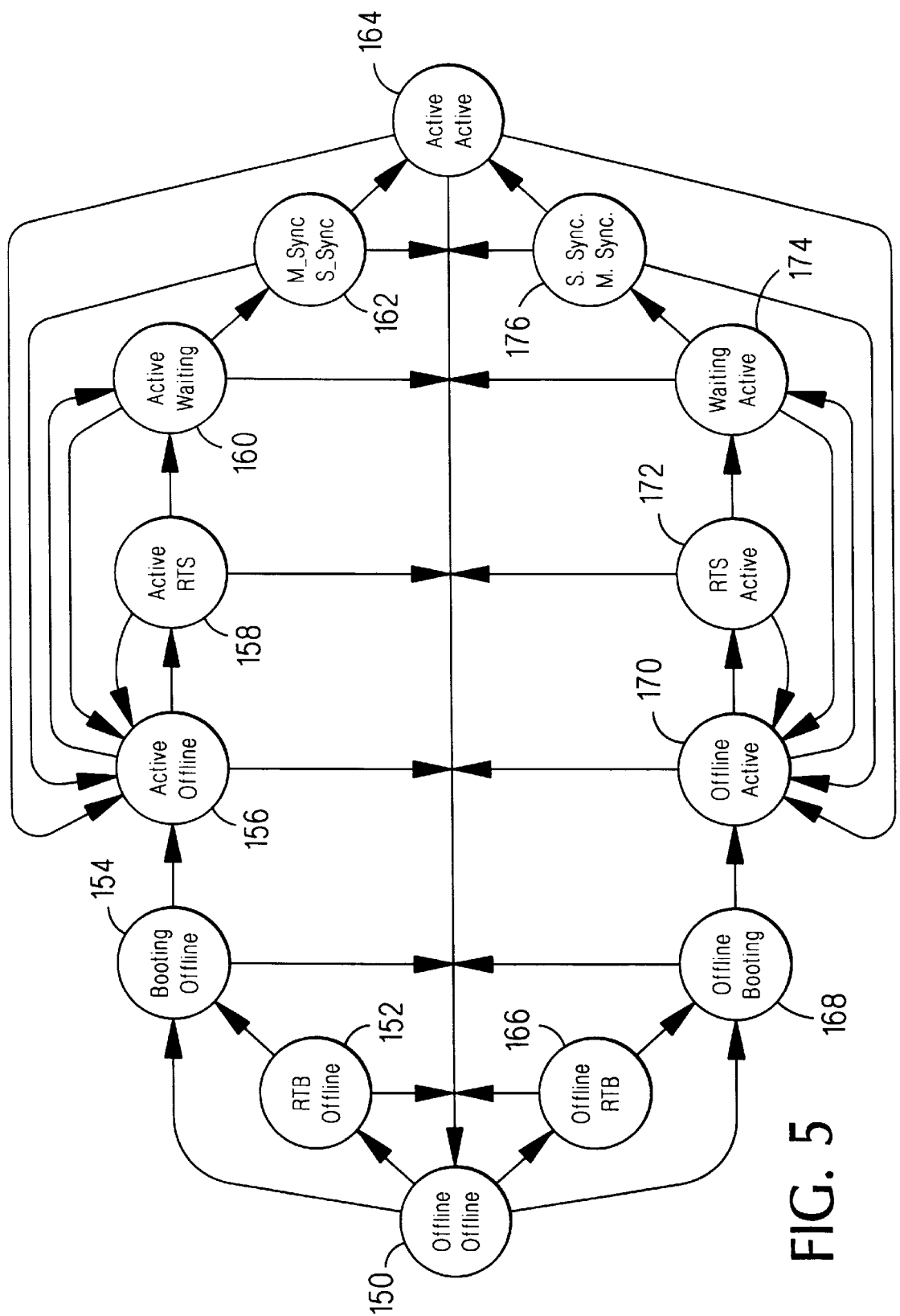
FIG. 5 is a state transition table for the system of FIG. 1.

Referring to FIG. 5, each CE 14 always operates in one of eight states. Because there are only a limited number of permissible state combinations, system 10 always operates in one of fourteen states. The major CE operating states are OFFLINE, RTB (ready to boot), BOOTING, ACTIVE, RTS (ready to sync), WAITING, M_SYNC, (synchronizing as master), and S_SYNC (synchronizing as slave). IOP Monitor 48 changes the operating states of CEs 14 based on the state of system 10 and user commands from console software 49. Through console software 49, a user can reset a CE 14 at any time. Whenever the user resets a CE 14, or a fault occurs in the CE 14, IOP Monitor 48 changes the state of the CE 14 to OFFLINE.

At startup, system 10 is operating with both CEs 14 OFFLINE (state 150). System 10 operates in the upper states of FIG. 5 (states 152–162) when CE 14a becomes operational before CE 14b and in the lower states (states 166–176) when CE 14b is the first to become operational. If CEs 14 become operational simultaneously, the first operational CE 14 to be recognized by IOP Monitor 48 is treated as the first to become operational.

When a CE 14 indicates that it is ready to boot by issuing a boot request, the state of the CE 14 changes to RTB if the CE 14 is not set to autoboot or to BOOTING if the CE 14 is set to autoboot. For example, if CE 14a issues a boot request when both CEs 14 are OFFLINE, and CE 14a is not set to autoboot, then the state of CE 14a changes to RTB (state 152). Thereafter, IOP Monitor 48 waits for the user, through console software 49, to boot CE 14a. When the user boots CE 14a, the state of CE 14a changes to BOOTING (state 154). If the user resets CE 14a, the state of CE 14a changes to OFFLINE (state 150).

If both CEs 14 are OFFLINE when CE 14a issues a boot request, and CE 14a is set to autoboot, the state of CE 14a changes to BOOTING (state 154). If CE 14a boots successfully, the state of CE 14a changes to ACTIVE (state 156).

When CE 14a is ACTIVE, and CE 14b issues a boot request, or if CE 14b had issued a boot request while the state of CE 14a was transitioning from OFFLINE to ACTIVE (states 152–156), the state of CE 14b changes to RTS (state 158) if CE 14b is set to autosync and otherwise to WAITING (state 160). If the state of CE 14b changes to RTS (state 158), IOP Monitor waits for the user to issue a synchronize command to CE 14b. When the user issues such a command, the state of CE 14b changes to WAITING (state 160).

Once CE 14b is WAITING, IOP Monitor 48 copies the contents of memory system 34a of CE 14a into memory system 34b of CE 14b. Once the memory transfer is complete, IOP Monitor 48 waits for CE 14a to transmit a quantum interrupt or I/O request IPI packet. Upon receipt of such a packet, IOP Monitor 48 changes the state of CE 14a to M_SYNC and the state of CE 14b to S_SYNC (state 162), and synchronizes the CEs 14. This synchronization includes responding to any memory changes that occurred while IOP Monitor 48 was waiting for CE 14a to transmit a quantum interrupt or I/O request IPI packet. Upon completion of the synchronization, the states of the CEs 14 both change to ACTIVE (state 164) and system 10 is deemed to be fully operational.

In an alternative implementation, IOP Monitor 48 does not wait for memory transfer to complete before changing the state of CE 14a to M_SYNC and the state of CE 14b to S_SYNC (state 162). Instead, IOP Monitor 48 makes this state change upon receipt of an IPI packet from CE 14a and performs the memory transfer as part of the synchronization process.

Similar state transitions occur when CE 14b is the first CE 14 to issue a boot request. Thus, assuming that CE 14b is not set to autoboot, CE 14b transitions from OFFLINE (state 150) to RTC (state 166) to BOOTING (state 168) to ACTIVE (state 170). Similarly, once CE 14b is ACTIVE, and assuming that CE 14a is not set to autosync, CE 14a transitions from OFFLINE (state 170) to RTS (state 172) to WAITING (state 174) to S_SYNC (state 176) to ACTIVE (state 164).

Figure 6:
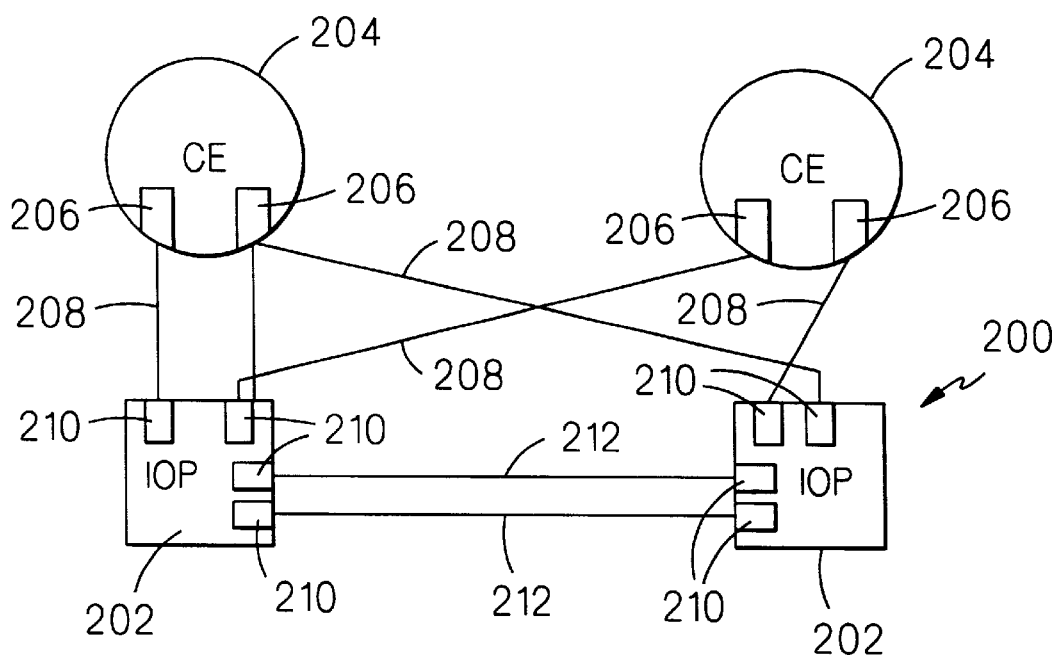
FIG. 6 is a block diagram of a fault resilient system.

In other embodiments of the invention, for example, referring to FIG. 6, a fault resilient system 200 includes two IOPs 202 and two CEs 204. Each CE 204 is connected, through an IPI card 206 and a cable 208, to an IPI card 210 of each IOP 202. IOPs 202 are redundantly connected to each other through IPI cards 210 and cables 212. Because every component of system 200 has a redundant backup component, system 200 is entirely fault resilient. In an alternative approach, cables 208 and 210 could be replaced by a pair of local area networks to which each IOP 202 and CE 204 would be connected. Indeed, local area networks can always be substituted for cable connections.

System 200 is operating system and application software independent in that it does not require modifications of the operating system or the application software to operate. Any single piece of hardware can be upgraded or repaired in system 200 with no service interruption. Therefore, by sequentially replacing each piece of hardware and allowing system 200 to resynchronize after each replacement, the hardware of system 200 can be replaced in its entirety without service interruption. Similarly, software on system 200 can be upgraded with minimal service interruption (that is, during the software upgrade, the application will become unavailable for an acceptable period of time such as two seconds). Also, disaster tolerance for purposes of availability can be obtained by placing each IOP/CE pair in a separate location and connecting the pairs through a communications link.

Figure 7:
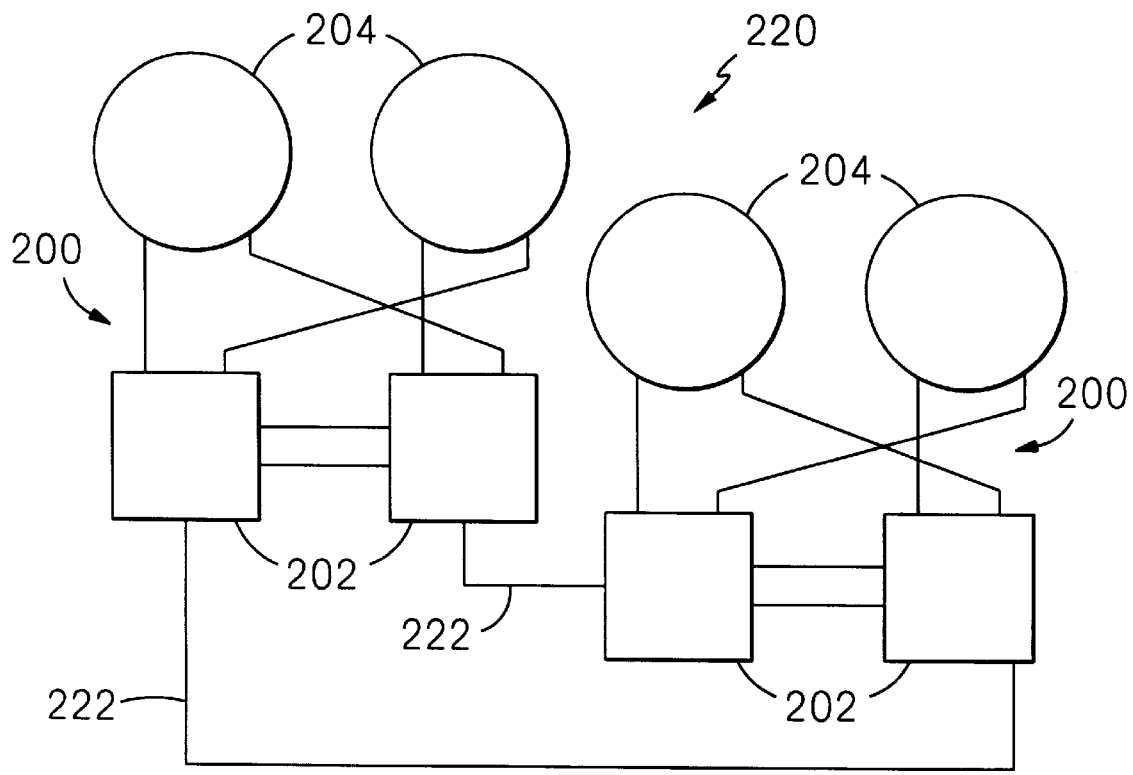
FIG. 7 is a block diagram of a distributed fault resilient system.

Referring to FIG. 7, a distributed, high performance, fault resilient system 220 includes two systems 200, the IOPs 202 of which are connected to each other, through IPI modules, by cables 222. System 220 uses distributed computing environment software to achieve high performance by running separate portions of an application on each system 200. System 220 is fault tolerant and offers the ability to perform both hardware and software upgrades without service interruption.

Figure 8:
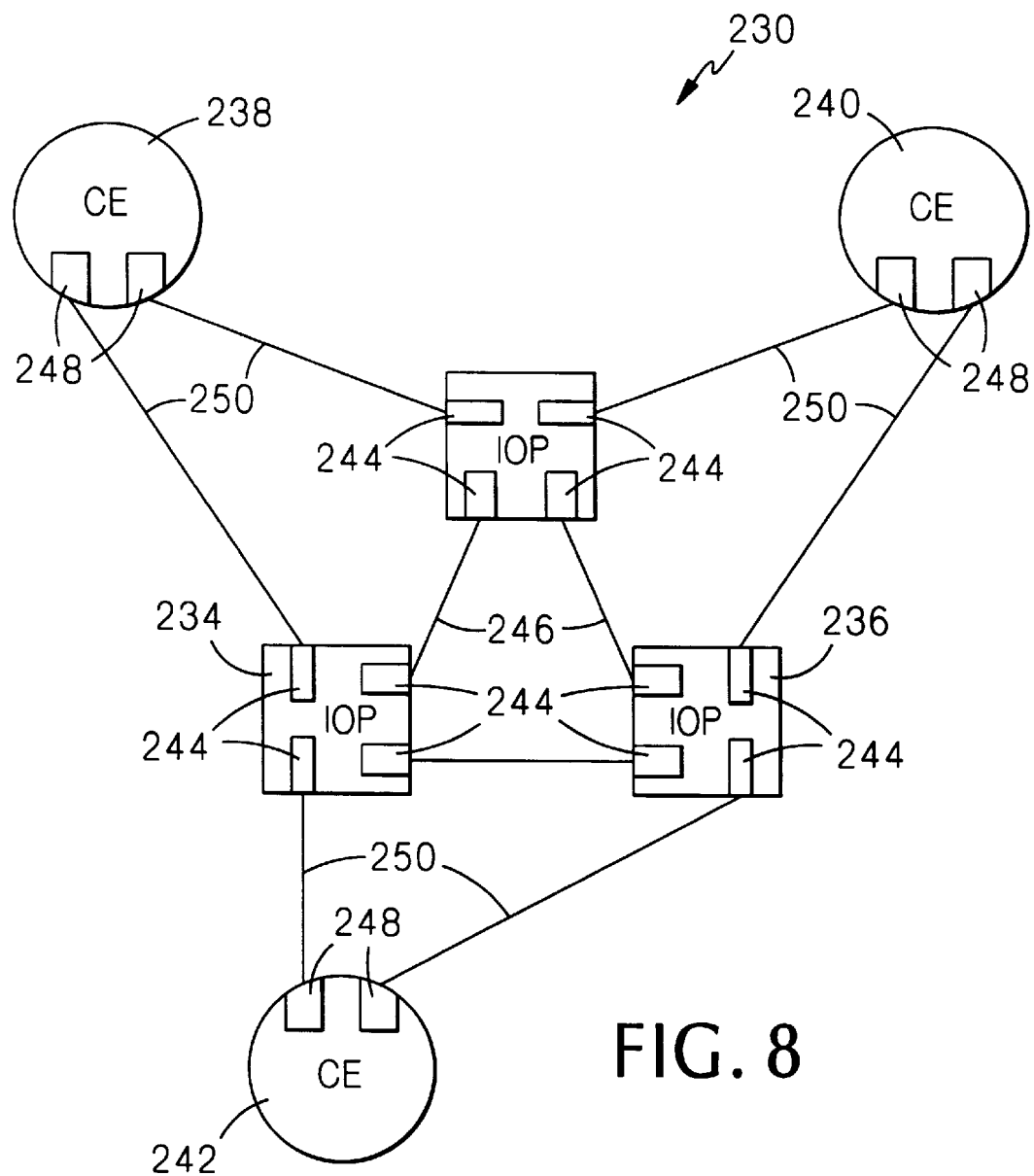
FIG. 8 is a block diagram of a fault tolerant system.

Referring to FIG. 8, a fault tolerant system 230 includes three IOPs (232, 234, and 236) and three CEs (238, 240, and 242). Through IPI modules 244 and cables 246, each IOP is connected to an IPI module 244 of each of the other IOPs. Through IPI modules 248 and cables 250, each CE is connected to an IPI module 244 of two of the IOPs, with CE 238 being connected to IOPs 232 and 234, CE 240 being connected to IOPs 232 and 236, and CE 242 being connected to IOPs 234 and 236. Like system 200, system 230 allows for hardware upgrades without service interruption and software upgrades with only minimal service interruption.

As can be seen from a comparison of FIGS. 7 and 8, the CEs and IOPs of systems 200 and 230 are identically configured. As a result, upgrading a fault resilient system 200 to a fault tolerant system 230 does not require any replacement of existing hardware and entails the simple procedure of adding an additional CE/IOP pair, connecting the cables, and making appropriate changes to the system software. This modularity is an important feature of the paired modular redundant architecture of the invention.

Because the components of system 230 are triply redundant, system 230 is more capable of identifying the source of a hardware fault than is system 10. Thus, while system 10 simply disables one or both of CEs 14 when an error is detected, system 230 offers a higher degree of fault diagnosis.

Figure 9:
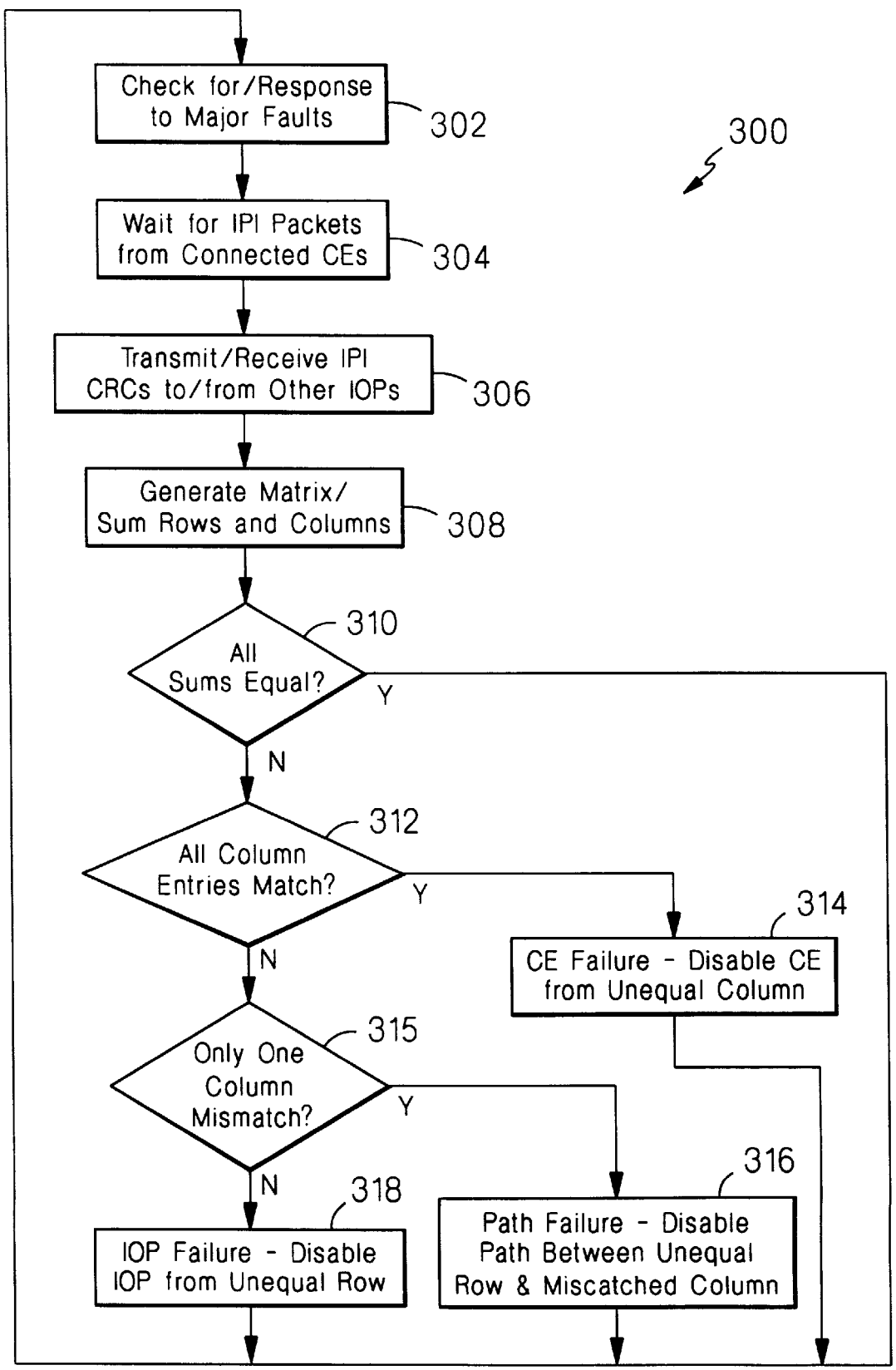
FIG. 9 is flowchart of a fault diagnosis procedure used by IOPs of the system of FIG. 8.

In one approach to fault diagnosis, as shown in FIG. 9, each IOP (232, 234, 236) of system 230 performs fault diagnosis according to a procedure 300. Initially, each IOP (232, 234, 236) checks for major faults such as power loss, broken cables, and nonfunctional CEs or IOPs using well known techniques such as power sensing, cable sensing, and protocol timeouts (step 302). When such a fault is detected, each IOP disables the faulty device or, if necessary, the entire system.

After checking for major faults, each IOP waits to receive IPI packets (that is, quantum interrupts or I/O requests) from the two CEs to which the IOP is connected (step 304). Thus, for example, IOP 232 waits to receive IPI packets from CEs 238 and 240. After receiving IPI packets from both connected CEs, each IOP transmits the checksums ("CRCs") of those IPI packets to the other two IOPs and waits for receipt of CRCs from the other two IOPs (step 306).

After receiving the CRCs from the other two IOPs, each IOP may generated a three by three matrix in which each column corresponds to a CE, each row corresponds to an IOP, and each entry is the CRC received from the column's CE by the row's IOP (step 308). Thus, for example, IOP 232 generates the following matrix:

|          | CE 238 | CE 240 | CE 242 |
|----------|--------|--------|--------|
| IOP 232  | CRC    | CRC    | X      |
| IOP 234  | CRC    | X      | CRC    |
| IOP 236  | X      | CRC    | CRC    |

After generating the matrix, IOP 232 sums the entries in each row and each column of the matrix. If the three row sums are equal and the three column sums are equal (step 310), then there is no fault and IOP 232 checks again for major faults (step 302).

If either the three rows' sums or the three columns' sums are unequal (step 310), then IOP 232 compares the CRC entries in each of the columns of the matrix. If the two CRC entries in each column match (step 312), then IOP 232 diagnoses that a CE failure has occurred and disables the CE corresponding to the column for which the sum does not equal the sums of the other columns (step 314).

If the CRC entries in one or more of the matrix columns do not match (step 312), then IOP 232 determines how many of the columns include mismatched entries. If the matrix includes only one column with mismatched entries (step 315), then IOP 232 diagnoses that the path between the IOP corresponding to the matrix row sum that is unequal to the other matrix row sums and the CE corresponding to the column having mismatched entries has failed and disables that path (step 316). For purposes of the diagnosis, the path includes the IPI module 244 in the IOP, the IPI module 248 in the CE, and the cable 250.

If the matrix includes more than one column with mismatched entries (step 314), then IOP 232 confirms that one matrix row sum is unequal to the other matrix row sums, diagnoses an IOP failure, and disables the IOP corresponding to the matrix row sum that is unequal to the other matrix row sums (step 318).

If, after diagnosing and accounting for a CE failure (step 314), path failure (step 316), or IOP failure (step 318), IOP 232 determines that system 300 still includes sufficient non-faulty hardware to remain operational, IOP 232 checks again for major faults (step 302). Because system 230 is triply redundant, system 230 can continue to operate even after several components have failed. For example, to remain operating in an availability mode, system 230 only needs to have a single functional CE, a single functional IOP, and a functional path between the two.

Using procedure 300, each IOP (232, 234, 236) can correctly diagnose any single failure in a fully operational system 230 or in a system 230 in which one element (that is, a CE, an IOP, or a path) has previously been disabled. In a system 230 in which an element has been disabled, each IOP accounts for CRCs that are not received because of the disabled element by using values that appear to be correct in comparison to actually received CRCs.

Procedure 300 is not dependent on the particular arrangement of interconnections between the CEs and IOPs. To operate properly, procedure 300 only requires that the output of each CE be directly monitored by at least two IOPs. Thus, procedure 300 could be implemented in a system using any interconnect mechanism and does not require point to point connections between the CEs and IOPs. For example, the CEs and IOPs could be connected to at least two local area networks. In an alternative approach, instead of summing the CRC values in the rows and columns of the matrix, these values can be compared and those rows or columns in which the entries do not match can be marked with a match/mismatch indicator.

A simplified version of procedure 300 can be implemented for use in a system 200. In this procedure, each IOP 202 of system 200 generates a two by two matrix in which each column corresponds to a CE 204 and each row corresponds to a IOP 202:

|        | CE 204 | CE 204 |
|--------|--------|--------|
| IOP 202 | CRC    | CRC    |
| IOP 202 | CRC    | CRC    |

After generating the matrix, each IOP 202 attaches a mismatch indicator to each row or column in which the two entries are mismatched.

If there are no mismatch indicators, then system 200 is operating correctly.

If neither row and both columns have mismatch indicators, then an IOP 202 has faulted. Depending on the operating mode of system 200, an IOP 202 either disables another IOP 202 or shuts down system 200. The IOP 202 to be disabled is selected based on user supplied parameters similar to the two availability modes used in system 10.

If both rows and neither column have mismatch indicators, then a CE 204 has faulted. In this case, IOPs 202 respond by disabling a CE 204 if system 200 is operating in an availability mode or, if system 200 is operating in an integrity mode, shutting down system 200. If both rows and one column have mismatch indicators, then one of the paths between the IOPs 202 and the CE 204 corresponding to the mismatched column has failed. Depending on the operating mode of system 200, IOPs 202 either disable the CE 204 having the failed path or shut down system 200. If both rows and both column have mismatch indicators, then multiple faults exist and IOPs 202 shut down system 200.

If one row and both columns have mismatch indicators, then the IOP 202 corresponding to the mismatched row has faulted. Depending on the operating mode of system 200, the other IOP 202 either disables the faulty IOP 202 or shuts down system 200. If one row and one column have mismatch indicators, then the path between the IOP 202 corresponding to the mismatched row and the CE 204 corresponding to the mismatched column has failed. Depending on the operating mode of system 200, IOPs 202 either account for the failed path in future processing or shut down system 200.

Figure 10:
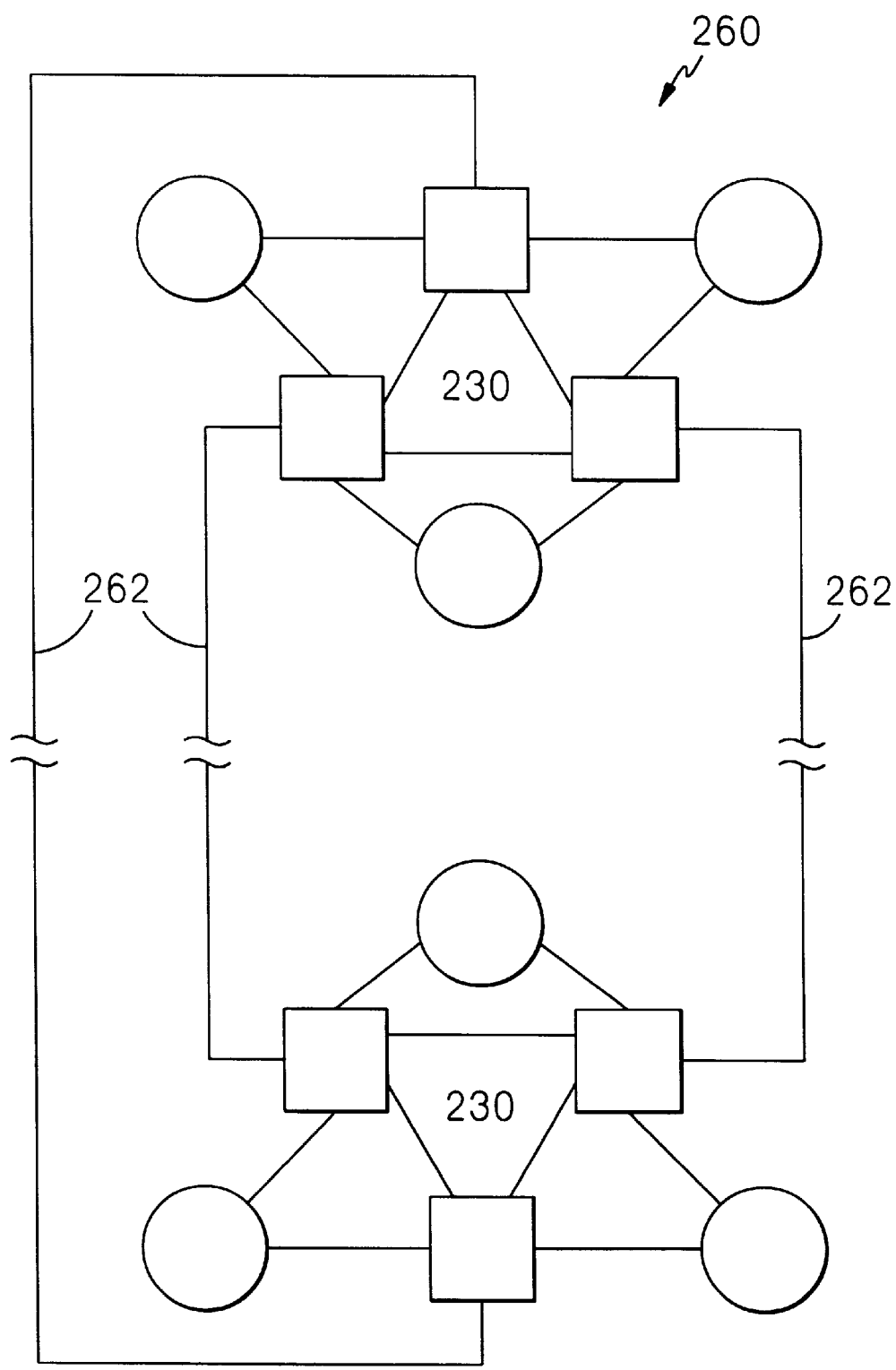
FIG. 10 is a block diagram of a disaster tolerant system.

Referring to FIG. 10, one embodiment of a disaster tolerant system 260 includes two fault tolerant systems 230 located in remote locations and connected by communications link 262, such as Ethernet or fiber, and operating in meta time lockstep with each other. To obtain meta time lockstep, all IPI packets are transmitted between fault tolerant systems 230. Like system 220, system 260 allows for hardware and software upgrades without service interruption.

As shown, the paired modular redundant architecture of the invention allows for varying levels of fault resilience and fault tolerance through use of CEs that operate asynchronously in real time and are controlled by IOPs to operate synchronously in meta time. This architecture is simple and cost-effective, and can be expanded or upgraded with minimal difficulty.

Figure 11:
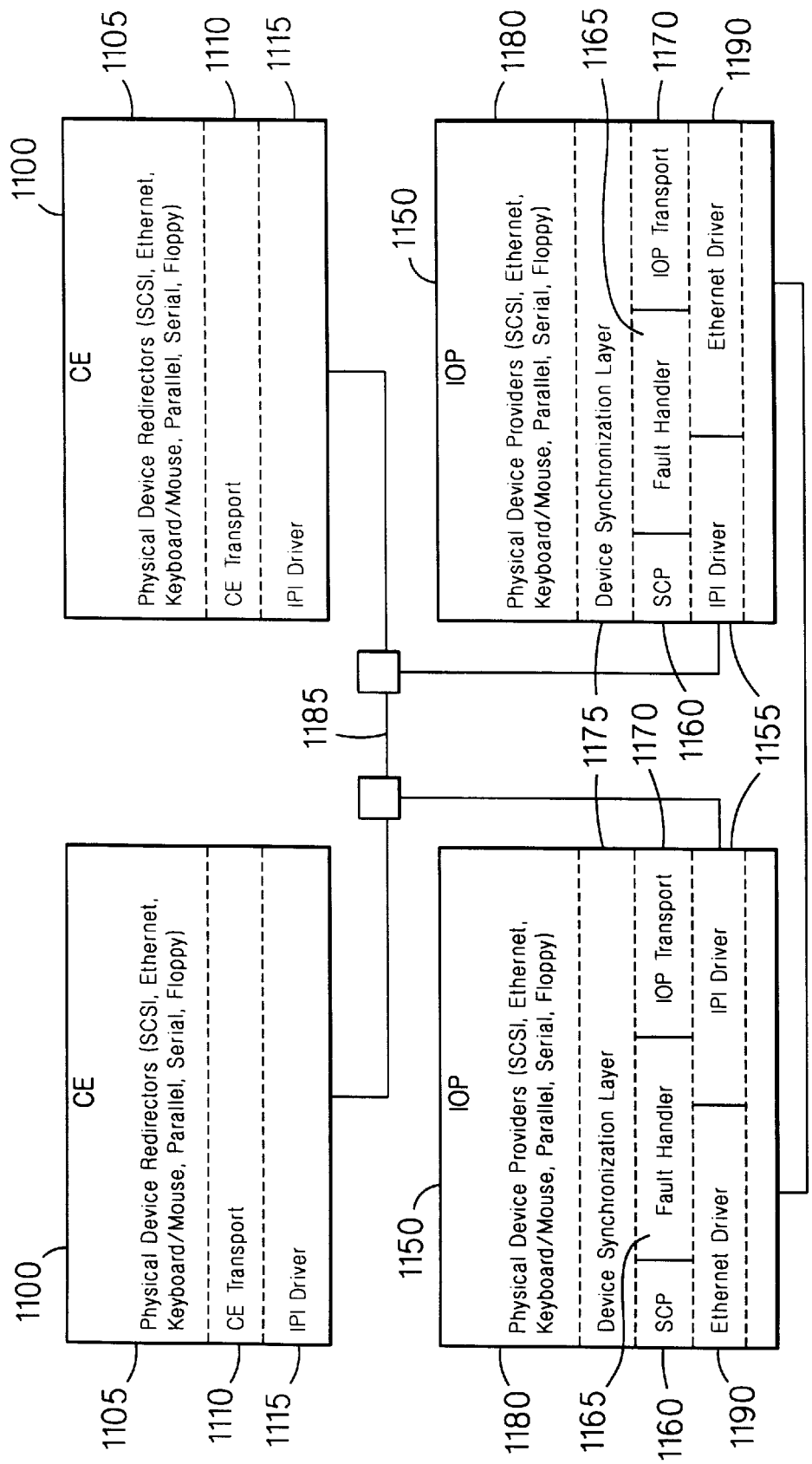
FIG. 11 is a block diagram of software components of a computer system.

FIG. 11 depicts the components of the system software architecture of an alternative embodiment of the invention that includes multiple CEs and multiple IOPs. Each CE 1100 includes a set of one or more Physical Device Redirectors 1105, a CE Transport layer 1110, and an IPI Driver 1115. The Physical Device Redirectors 1105 intercept I/O requests directed to peripheral devices, package the requests, and send the requests to the CE Transport 1110. The Physical Device Redirectors 1105 also receive responses to the requests from the CE Transport 1110, unpackage the responses, and return the responses to the operating system or applications software that initially made the I/O requests to the peripheral devices.

The system software architecture depicted in FIG. 11 supports a multi-threaded processing environment. In such an environment, each thread is a separate stream of instructions that may be processed by the computing element. When a Physical Device Redirector 1105 intercepts an I/O request by a particular thread, processing of that thread stops until the Physical Device Redirector 1105 returns the response to the request.

The CE Transport 1110 communicates I/O requests between the CEs and the IOPs. The CE Transport also keeps track of responses expected and received from the IOPs on a per request basis. The CE Transport searches for completed requests (i.e., requests to which all IOPs have responded) as IOP responses to redirected requests are received and sends the resultant data to the Physical Device Redirector 1105.

Each IOP 1150 includes an IPI driver 1155, a state control program (SCP) 1160, a fault handler 1165, an IOP Transport layer 1170, a Device Synchronization Layer (DSL) 1175, and a set of one or more Physical Device Providers 1180. The IPI Drivers 1115, 1155 of both the CEs and the IOPs control the actual transmission and reception of data along the interconnect paths 1185 between the CEs and the IOPs. The state control program 1160 initiates and responds to state transitions involving the IOPs and the CEs. The fault handler 1165 responds to reports of detected faults by deconfiguring appropriate hardware components. The IOP Transport 1170 transports data between the IPI Driver and the other software components of the IOPs. The Device Synchronization Layer 1175 is responsible for synchronizing all redirected requests and responses between IOP-based peripherals. This synchronization includes the reprocessing and restructuring of the requests and responses due to state transitions of the IOPs, the CEs, or the peripheral devices. The Physical Device Providers 1180 unpackage requests received from the DSL 1175, process the requests, package responses, and send the responses to the DSL 1175. Each IOP also may include an ethernet driver 1190 or other mechanism that permits direct communication between the IOPs.

As noted above, the architecture of the described embodiments requires redirection of all I/O requests from the CEs to one or more IOPs. Responses to these redirected requests must be synchronized. Accordingly, all IOPs responding to a redirected request must respond to the request in a known way and must describe how all other IOPs will respond. Moreover, an IOP must respond to a redirected request even if the IOP does not have a device capable of processing the request. These requirements permit software running on the CEs to compare the responses of the IOPs for consistency.

FIGS. 12A and 12B provide an illustrative example of appropriate IOP responses (FIG. 12B) to requests by a CE (FIG. 12A). As shown, each disk of a two-disk shadow set is associated with a different IOP, with the disk 1200 associated with the first IOP 1205 functioning normally and the disk 1210 associated with the second IOP 1215 being offline. A request from the CE 1100 to the shadow set for data is redirected to the IOPs, and both IOPs respond. (The second IOP 1215 receives all requests directed to the shadow set even though its associated disk 1210 is offline.) Each IOP indicates that the first IOP 1205 is responding with the expected data and that the second IOP 1215 is responding with no data.

The CE Transport 1110 (FIG. 11) monitors the responses provided by the IOPs. The CE Transport compares the responses for consistency once all IOPs have responded to a request. The responses must be consistent in indicating which IOPs responded to the request with actual data and which IOPs did not. Moreover, if more than one IOP responds with data, then the data provided by the IOPs must be consistent. If the responses pass the consistency checks, then the CE Transport provides a response containing actual data to the appropriate Physical Device Redirector 1105 in the CE 1100 and discards the no-data response. Thereafter, the CE Transport informs the IOPs that all IOPs have responded to the request and further informs the IOPs of the outcome of the comparison. If the responses do not pass the consistency checks, then one of the IOPs is disabled and, in effect, removed from the architecture.

Figure 13:
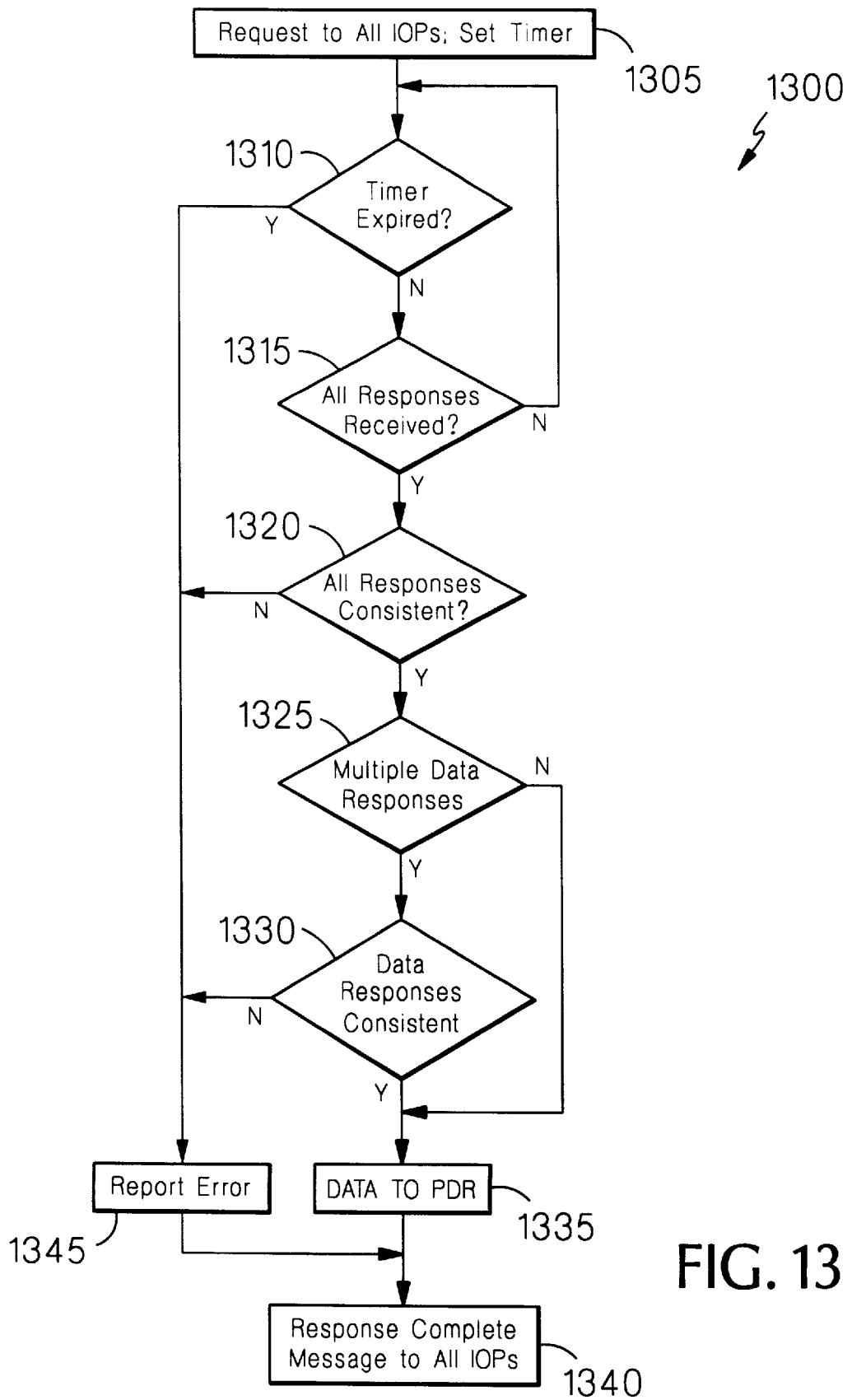
FIG. 13 is a flowchart of a flush procedure implemented by the CE Transport.

The CE Transport 1110 implements the request-response architecture employed by the system of FIG. 11 using the procedure 1300 illustrated in FIG. 13. The CE Transport first instructs the IPI Driver 1115 to send a request from a Physical Device Redirector 1105 to all IOPs 1150 (step 1305). At the same time, the CE Transport 1110 initializes a timer. If the timer has not expired (step 1310) before all responses are received (step 1315), then the CE Transport compares the responses to determine whether they are consistent (step 1320). If the responses are consistent and there are multiple responses that include data (step 1325), then the CE transport compares the data responses (step 1330). If the data responses are consistent, or if there is only a single data response, then the CE Transport sends the data to the appropriate Physical Device Redirector 1105 (step 1335). Finally, the CE Transport instructs the IPI driver to send a Response Complete message to all of the IOPs (step 1340).

If the timer expires (step 1310) before all responses are received, or if inconsistent responses are received (steps 1320, 1330), then the CE Transport reports the occurrence of an error (step 1345) and instructs the IPI driver to send a Response Complete message to all of the IOPs (step 1340).

In the IOPs, the Device Synchronization Layer (DSL) 1175 makes all IOP-based physical devices appear to the CEs as logical or virtual devices. In addition, the DSL combines device and state information from all IOPs and uses this information to project a single logical IOP to the Physical Device Redirectors of the CEs. Thus, a system configured as illustrated in FIG. 14A would appear to the CE-based Physical Device Redirectors as having the logical representation illustrated in FIG. 14B.

The DSL 1175 represents devices logically so that the CE-based redirectors have no knowledge of the locations and characteristics of physical devices. For example, a SCSI redirector would not know that Disk C: (1400, 1405) and Disk D: (1410, 1415) are shadowed drives and would simply treat them as though they were each a single drive (1420, 1425). Also, an Ethernet redirector would not know that multiple Ethernet controllers provide a primary controller (1430) and a secondary controller (1435) and instead would be aware only of a single Ethernet controller (1440).

The DSL 1175 receives all redirected requests from the IOP Transport 1170. The DSL then decides whether to send a request to a Physical Device Provider 1180 or to send a no-data response. A critical function of the DSL is that it only sends a request to a device provider when that provider is expected to process the request. For example, if two IOPs control a shadow set of disks, with the first IOP controlling an offline disk and the second IOP controlling an active disk, the DSL of the first IOP would not send a request to its disk, and would instead respond with a no-data response. The DSL on the second IOP would send the request to its disk, and would eventually respond with the data from its disk along with an indication that the first IOP would be providing a no-data response.

With every response, the DSL 1175 indicates how every other IOP will respond. The DSL accomplishes this by maintaining a record of the status of every other IOP and associated device in an internal device state table.

The DSL 1175 also accounts for the effects of state changes in the CEs, the IOPs or the peripheral devices. For example, the DSL accounts for the situation that arises when the state of a peripheral device changes after an IOP indicates how the other IOPs will respond to a request, but before the other IOPs actually respond to the request. If the other IOPs were to respond after the state change, their responses could differ from the response expected by the first IOP. The DSL solves this problem by disabling all response transmissions from the affected device and initiating a flush sequence that causes the CE Transport to discard all previously received, incomplete responses for the particular device. (As previously noted, the CE Transport does not consider a request to be complete until responses to the request have been received from all IOPs.)

Upon receipt of a flush completion indication from the CE Transport 1110, the DSL 1175 of each IOP 1150 updates its internal device state table and reenables transmission of responses for the particular device. Finally, the DSL reprocesses any incomplete responses that were submitted to the CE Transport prior to the flush.

As noted above, the CE Transport 1110 sends an indication to the DSL 1175 of each IOP upon completion of each response. As such, the DSL always knows which responses are complete. This permits the DSL to keep track of incomplete responses. When a device state change occurs and an ensuing flush is issued, the DSL can, upon receipt of the flush complete indication, reset its internal knowledge of the device state and re-issue any affected incomplete requests. This functionality is critical, for example, to the implementation of standby-primary processing since the DSL may have responded to a particular request on behalf of a standby device with a no-data response. If the primary device failed and was unable to process the request, the DSL would initiate the flush sequence and re-issue the request. This time the standby device would be considered the primary device (since the primary device had failed) and would receive the request.

The internal state table of the DSL 1175 keeps track of all flushes that can affect the I/O devices and the IOPs. The DSL, through use of the state table, permits multiple flushes to affect one or more devices, and permits multiple state transitions to occur at a single time. This permits seamless handling of multiple related or unrelated component state changes.

The DSL 1175 also mandates that all device state changes originate from the IOP 1150 that owns the device. This permits the DSLs of different IOPs to have a different simultaneous idea of the state of a device without risk that inconsistency problems will occur at the CE Transport 1110. This also permits the DSL to be fully distributed since there is no need to freeze request or response queues while a master software entity determines whether a steady state operation has been achieved.

In most circumstances, the Physical Device Providers 1180 need not consider the state of a peripheral device or an IOP because the DSL 1175 only sends a request to a device provider when the device provider is expected to process the request. Similarly, the DSL does not consider the I/O policy associated with a particular device. For example, the DSL does not consider whether a disk device has a shadowed or a single-ended I/O policy. However, the DSL does use I/O policies to determine which providers on which IOPs will receive a particular request to process. This permits the DSL to arbitrarily treat any device as shadowed, singled-ended, virtual, or primary/standby even though all combinations of I/O policies and device types do not necessarily make sense.

The DSL 1175 handles all device state transitions, including device failure, device activation, device merge, and manual device enable/disables In addition, the DSL transparently handles all IOP state transitions, including IOP joining, IOP activation, IOP removal, and IOP graceful shutdown, as these transitions relate to device states. The DSL also responds automatically to requests that cannot be satisfied on behalf of the device providers. The DSL provides a full featured application program interface (API) set that is useable by developers.

The DSL 1175 provides automatic request timeout support. In this regard, the DSL starts a recovery process if a CE-originated request does not complete within a specified period of time. During the recovery process, the DSL determines which IOP 1150 has stalled and notifies the fault handler.

The DSL 1175 can apply any I/O policy to any physical device. For example, the DSL can configure a hard disk as a single-ended device instead of a shadowed device. Similarly, the DSL can configure, for example, a CD-ROM player or a serial port as a standby/active device instead of as a single-ended device.

As discussed above, the DSL 1175 initiates a flush sequence in the CE Transport 1110 of one or more CEs 1100 in response to a state change in a peripheral device or an IOP 1150. The flush sequence causes the CE Transport to flush all outstanding activity in the messaging pipeline of the corresponding CE with respect to indicated devices or Physical Device Providers 1180 and to provide notification of completed requests as a result of the flushing.

The flush mechanism provides varying granularity of request-response synchronization as required by the DSL. Thus, a system-wide flush can be implemented for all devices (or Physical Device Providers), or a flush can be implemented for a class of devices or a specific device.

Upon completion of the flush sequence, the DSL of each IOP knows exactly which request-response pairs have been processed and completed. The DSL uses this knowledge to reissue, re-execute or re-transmit any necessary request-response pairs to permit recovery from the transition (or stimulus) within the system that disrupted the steady state operation of one or more devices. This allows the DSL to react to changes in the system that affect steady state operation of the devices. Once a flush sequence is initiated and completed, the DSL can determine exactly which requests or responses must be reprocessed or redirected to other devices for completion.

Each CE Transport 1110 maintains a database of outstanding requests. The database includes a list of all outstanding I/O requests in the system, each identified by a unique identifier called a XRN (Transport Reference Number).

Figure 15:
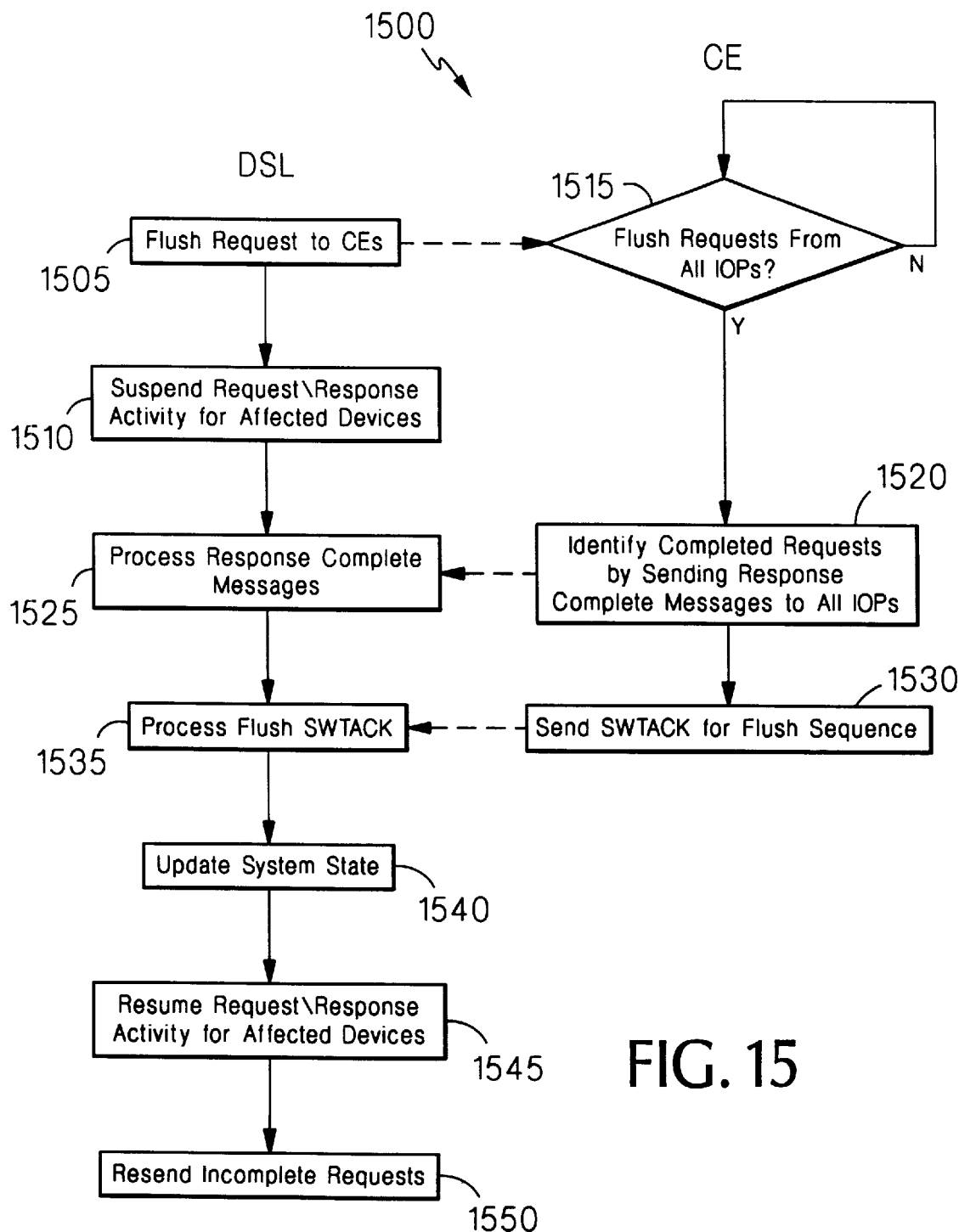
FIG. 15 is a flowchart of a flush procedure.

The flush sequence is carried out according to the procedure 1500 illustrated in FIG. 15. First, the DSL 1175 of each IOP 1150 initiates a flush sequence by sending a flush request to all of the CEs 1100 (step 1505). The DSL then suspends all request/response processing activity for the devices that are involved in the flush sequence until the flush sequence is completed (step 1510). Each CE receives a flush request and waits for matching flush requests from every IOP in the system (step 1515). The CE enters the flush request into the database and tracks the flush request in the same way that the CE tracks operating system requests. When a flush request has been received from all IOPs, the CE indicates that the first portion of the flush sequence is completed. The completion of this portion of the flush sequence signifies that all activity that was in the IOP-to-CE message pipelines has been flushed out and processed by the CEs.

Before acknowledging completion of the flush sequence, the CE first sends acknowledgments to the IOPs as to which outstanding requests have been completed (step 1520). In some cases, I/O requests may be completed by flushing responses through the IOP-to-CE pipelines. The CE sends a SWTACK (Software Transaction Acknowledgment) for each request that was completed and removes the completed request from the database. Each SWTACK contains the request's original XRN. The XRN allows the IOPs to associate the SWTACK with the proper completed request.

After sending a SWTACK for each completed request, the CE sends a SWTACK for the flush sequence (step 1530). Messages are delivered in order through the CE-to-IOP message pipelines (or are reordered to reflect their transmission sequence). Accordingly, the flush SWTACK serves to flush the request completion notification SWTACKs through the CE-to-IOP message pipelines. Thus, when the DSL receives the SWTACK for the flush sequence (step 1535), the DSL has already received and processed all SWTACKs for requests that were originally in the message pipelines and have since completed (step 1525). Upon receiving the SWTACK for the flush sequence, the DSL knows the state of all request/response activity in the system. The DSL responds to this information by updating the state of the system (step 1540). Thereafter, the DSL resumes request-response activity for affected devices (step 1545), and resends any incomplete affected requests (step 1550). This re-synchronizes the devices against the new state to achieve a steady state of operation for the device or devices involved in the flush sequence.

Since each flush sequence is uniquely tagged with its own XRN, more than one flush can be in progress at a time. The flush processing software in the CE Transport and the DSL abides by certain rules as to how outstanding flush sequences are processed and in what order they are acknowledged. This allows the DSL to preempt or override previously-issued flush sequences due to subsequent or secondary transitions that might occur within the system.

The system software implements a freeze protocol to ensure that IOP-to-CE communications will not affect meta time synchronization of the CEs. As previously discussed, the IOPs operate asynchronously to the CEs and to other IOPs due to the asynchrony inherent in I/O devices. For this reason, communication between the CEs and the IOPs needs to occur in a way that will not disturb the meta time synchronization of the CEs. CE-to-IOP communication is synchronous to the CE instruction stream and will not affect CE lockstep as long as sufficient buffering is provided. However, IOP-to-CE communication is by nature asynchronous to the instruction stream of each CE. Accordingly, IOP-to-CE communication, if handled improperly, could affect each CE differently and result in divergence of the CE instruction streams. The freeze protocol serves to delay processing of asynchronous data from the IOPs until the data can be handled synchronously by all CEs. In particular, the freeze protocol serves to delay implementation of the procedure 1300 by the CE Transports 1110 until all of the CE Transports 1110 are ready to implement the procedure 1300.

The freeze protocol provides four primary features: synchronized processing of input data streams from the asynchronous IOPs across the loosely synchronized CEs; synchronized time updates to the CEs; a deep-freeze mechanism that allows an IOP to synchronously hold all CEs in a captive state for an extended period of time; and fault detection/diagnosis with respect to the communication paths between the CEs and the IOPs.

The freeze protocol provides CE synchronization using a so-called freeze cycle. The CE Transport 1110 of a CE may initiate a freeze cycle each time that it is activated by a Physical Device Redirector 1105 to service a redirected I/O operation. However, to prevent the use of excessive bandwidth in performing freeze cycles, implementations of the software may initiate a freeze cycle every time that a certain number of I/O requests occurs or a certain number of instructions are processed without an I/O request. For example, the CE Transport 1110 may implement a freeze cycle with every fifth I/O request or every ten thousand instructions.

The CE Transport 1110 initiates a freeze cycle by transmitting a high-priority freeze request message to all active IOPs and waiting for freeze response messages from all active IOPs. Since all of the CEs are processing the same instruction stream, the CE transport 1110 of each active CE will transmit a freeze request message to all active IOPS. Each IOP receives the freeze request messages from the CEs. When an IOP has received a freeze request message from all active CEs, this indicates that the CEs are at the same point in their instruction streams (i.e., in synchronization) and that it is permissible for the CEs to process received data using the procedure 1300. Accordingly, the IOP responds by sending a freeze response message to ail active CEs.

The CEs 1100 receive the freeze response messages from the IOPs and place the messages in the normal-priority message queues of the IPI Driver 1115 to provide an inter-CE synchronization point for the CE Transport 1110. Finally, after receiving freeze response messages from all active IOPs, the CEs terminate the freeze cycle by transmitting freeze release messages to the IOPs.

The CE Transport 1110 invokes the freeze cycle through the IPI Driver 1115. The IPI Driver responds by initiating the freeze cycle (i.e., sending the freeze request message) and returning control to the CE Transport 1110. This permits the CE Transport 1110 to continue processing in parallel with the IPI Driver's handling of the freeze protocol messages. The CE Transport performs whatever useful work it can, such as transmitting normal priority messages, or draining and processing messages from the receive queue of the CE 1100. The CE Transport does not return control to the operating system until the CE Transport has encountered a freeze response message in the normal-priority receive queue corresponding to each active IOP.

The IPI Driver 1115 attempts to complete the freeze cycle as quickly as possible. To this purpose, the IPI Driver composes a priority message and sends the message to all active IOPs 1150. The message carries no data to the IOPs and merely serves as an indication that the freeze cycle has started. The IPI Driver starts a freeze response timeout counter after sending the priority message to detect failure of any IOP to respond. Typically, the length of this counter is on the order of twice the worst-case message transmit time. This provides each IOP with sufficient time to complete transmission of any normal priority message that it may be transmitting upon receipt of the freeze request message before the IOP transmits a freeze response message. Typically, normal priority messages have a size limit of, for example, 64 kilobytes, to ensure that the worst-case message transmit time will have a reasonable value.

The IPI Driver 1155 of each IOP 1150 places a timestamp update in the freeze response message. This timestamp corresponds to the number of clock ticks since the last freeze response message transmitted by the IOP. Thus, a CE 1100 may receive different timestamp updates from different IOPs. Accordingly, the CEs designate one IOP 1150 as a meta-time server to ensure that all CEs will update their local time clock identically.

After receiving a freeze request message from all active CEs, the IPI Driver 1155 of the IOP 1150 sends the freeze response message as a microcode-formatted priority message. Upon sending the message, the IOP initiates a freeze release timeout counter to detect failure of a CE to respond to the freeze response.

The IPI Driver 1115 of each CE is interrupted to service the incoming freeze response message, and responds by reformatting the message into a normal-priority message and placing the message at the bottom of the normal-priority message queue. Placement of the message in the message queue completes the time-critical portion of the freeze cycle, since it permits the CE Transport 1110 to return control to the operating system.

Once the CE's IPI Driver 1115 has received and processed the freeze response from the last active IOP, the IPI Driver 1115 broadcasts a freeze release message to the active IOPs. This completes the freeze cycle for the CE 1100. The IOP 1150 receives the release message and cancels the freeze release timer upon receipt of a release message from every active CE 1100.

As noted above, time updates are provided to the operating system by including time increments in the freeze response packet. The IOP IPI Drivers 1155 maintain the time increments using an internal 100 $\mu$s timer interrupt. Only one of the IOPs is designated as the time provider, and the time increment from that IOP is used by all of the CEs. The IOP's IPI Driver 1155 transmits the delta time since the last freeze response-packet was transmitted as the time increment. The CE Transport 1110 uses this value to update the time-of-day clock of the operating system after a freeze response packet has been processed for all receive queues.

A deep freeze protocol is a variation of the normal freeze protocol and serves to suspend normal activity between the CEs and the IOPs to allow major system state transitions to occur. The deep freeze state is invoked by the IOP software, which uses the IOP Transport 1170 to command the IOP IPI Driver 1155 to replace the next freeze response message with a deep freeze response message. The format of the deep freeze response message is identical to that of the normal freeze response message with the exception that different opcodes are used to designate the two types of messages. The deep freeze response carries a meta-time update like a normal freeze response. In addition, the deep freeze response causes the initiating IOP to disable its transmitter without initiating a timeout counter.

The IOP's IPI Driver 1155 sends the deep freeze response to all active CEs to inform them that a deep freeze state is requested. The CEs respond by converting the deep freeze response to a normal-priority response message and adding the message to the normal-priority message queue, with an indication that the message is a deep freeze response instead of a normal freeze response. The CEs a continue to process normal freeze response messages from the other IOPs in the normal manner.

After receiving a normal freeze response or a deep freeze response from all active IOPs, the CE's IPI Driver 1115 sends a deep freeze request message to the IOPs that are not yet in the deep freeze state and restarts the freeze response timer.

Receipt of a deep freeze request informs the IOPs that another IOP has injected a deep freeze cycle into the current freeze cycle. (Normally, the IOP IPIs would have received a freeze release message.) Each IOP responds to the freeze request by cancelling the freeze release timeout counter, turning off the IOP's transmitter path, sending to all active CEs a deep freeze response message with a meta-time update since the previous freeze response, and restarting the freeze release timeout counter.

The IPI Drivers 1155 of the CEs receive the deep freeze responses and insert them into the appropriate receive queues. Upon receipt of a deep freeze response from each active IOP, the CE Transport 1110 cancels the response timer and issues the normal freeze release message to the IOPs.

The CE Transport 1110, in the mean time, has encountered a combination of normal freeze response messages and deep freeze response messages in the various receive queues. Detection of a single deep freeze response causes the CE transport to process beyond the normal freeze response to the deep freeze response. Hence, the CE IPI Driver 1115 must ensure that both the freeze responses and the deep freeze responses make their way into the receive queues in the proper order.

Only priority messages can be exchanged between components when the system is in the deep freeze state. In addition, no new freeze cycles will be initiated by the CE Transport while the system is in the deep freeze state.

Once the major state transition requiring the deep freeze cycle has completed, the deep freeze state is terminated by initiating a deep freeze termination cycle with the issuance of a deep freeze termination request. The deep freeze termination cycle typically is originated by the IOP Transport 1170 that invoked the deep freeze cycle, but any IOP Transport 1170 can invoke a deep freeze termination cycle with the same result.

The deep freeze termination request is a register-level request to the IPI Driver 1155 that causes the driver to broadcast a deep freeze termination priority message to all active CEs. The IPI Driver 1115 of each CE receives this message and echoes the message to all active IOPs. Upon receiving the deep freeze termination message, the IOPs activate their transmission paths and exit the deep freeze state.

The freeze response timers and the freeze release timers account for the occurrence of errors during the freeze protocol. If a CE's freeze response timer expires, the CE generates a high priority system error (SYSERR) packet containing the CE's freeze status virtual register and sends it to all active IOPs. The IOPs supplement the SYSERR packet with relevant state information of their own and forward the SYSERR packet to the Fault Handlers 1165.

If an IOP's freeze release timer expires, the IOP generates a local SYSERR packet containing only state information from the detecting IOP and passes this SYSERR packet to the Fault Handler 1165. The detecting IOP then sends a similar SYSERR packet to all active CEs. The CEs supplement the SYSERR packet with their own state information and echo the SYSERR packet back to all active IOPs. The IOPs store additional state information in the echoed SYSERR and forward the message to the Fault Handler 1165.

After generating a SYSERR packer, the IPI Driver 1115, 1155 of the CE 1100 or the IOP 1150 waits for the Fault Handler 1165 residing on the IOP 1150 to resolve the error condition. The Fault Handler determines which path is at fault and commands the IOP IPI Driver 1155 to disable the faulty path. After disabling the faulty path, the IOP IPI Driver evaluates the state of the freeze protocol and resumes normal processing once the requirements for such processing are met.

The IOPs do not apply a timeout for the reception of freeze requests from all active CEs. If one or more CEs fail to send a freeze request message, or if a freeze request message is not received for some other reason, the other CEs will eventually generate a freeze response timeout SYSERR packet.

The CE IPI Driver 1115 state transitions required to service the freeze protocol, including the deep freeze extension, are illustrated in FIG. 16A. The IOP IPI Driver 1155 state transitions required to service the freeze protocol, including the deep freeze extension, are illustrated in FIG. 16B.

The system implements a message based fault notification and reporting environment using Fault Handler 1165. From an error-processing perspective, the system can be viewed of as including error reporting elements and error processing elements. The error reporting elements are any components in the system that detect error conditions or determine status conditions and transmit the information to an error processing element. The error processing elements, or fault handlers, receive error information from the reporting elements.

The collection of error messages that result from a single fault are referred to as a fault event. A fault handler uses the error messages associated with a fault event to identify a particular system component that has failed and caused the fault event. The identified component is referred to as a callout. A fault handler may also take or initiate action to resolve the fault and restore normal, if degraded, system operation.

Error reporting elements may be either hardware or software entities. The only requirement is that they must be capable of transmitting error information to the error processing elements or causing such information to be transmitted.

An error reporting element that detects a system error encapsulates the system error into a uniformly formatted packet referred to as a SYSERR. The error reporting element then sends the SYSERR (or causes the SYSERR to be sent) to all error processing elements that have connectivity to the reporting element. The architecture of the physical system is configured so that any error condition causes generation of at least one SYSERR packet. The physical system is also configured so that, ideally, each error reporting element is connected to every error processing element. This permits the lack of an error indication when one was expected to be used as diagnostic information.

A single SYSERR packet may not unambiguously identify the source of a fault event in many instances. When this situation arises, the fault handlers rely on the diagnostic information provided by SYSERR packets from multiple sources to unambiguously identify the source of the fault.

Figure 17:
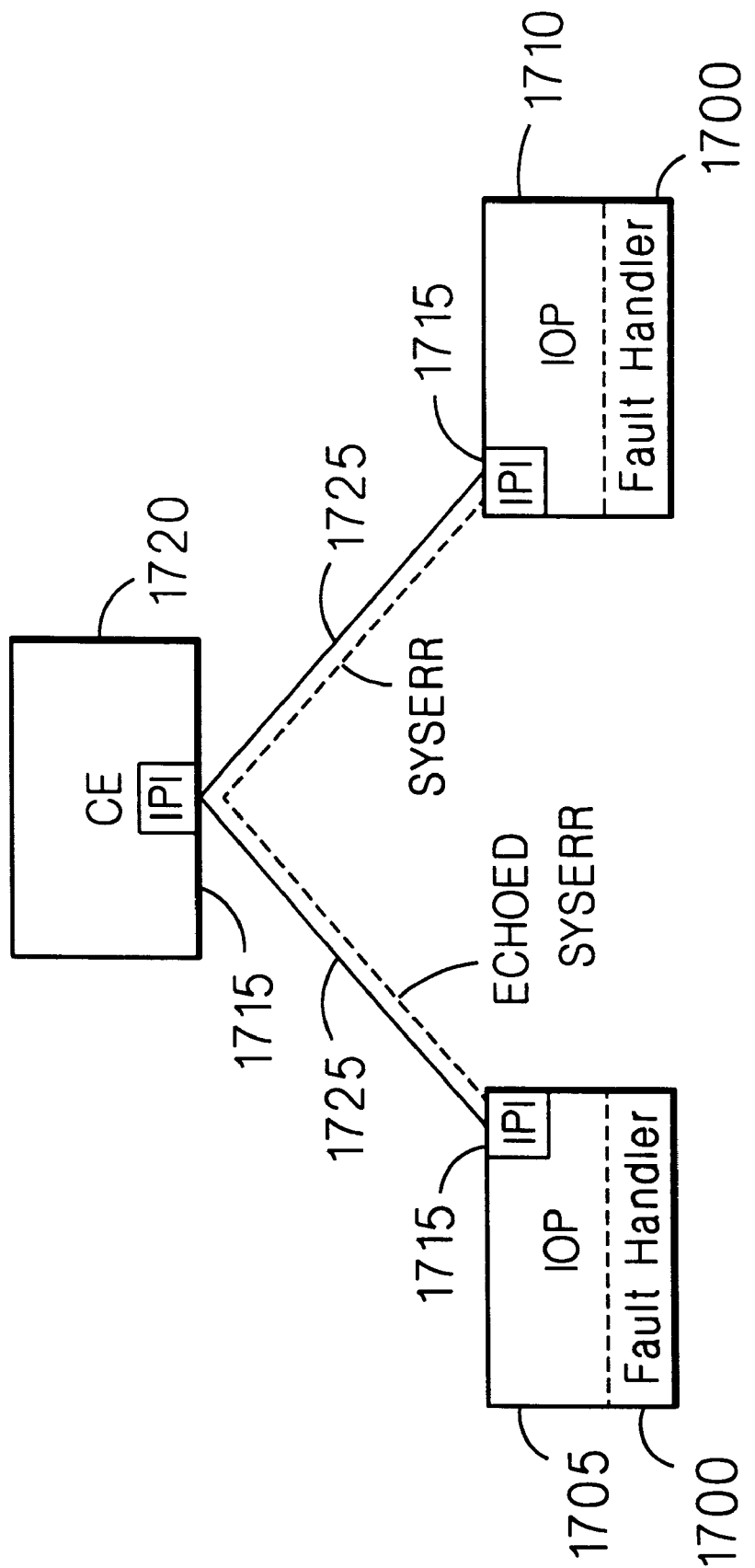
FIG. 17 is a block diagram of a system.

To provide connectivity between the error reporting elements and the fault handlers, some transport components are capable of echoing SYSERRs generated by a reporting element to other fault handlers in the system that are directly connected to the transport components. Thus, fault handlers that are not directly connected to a reporting element can still obtain error information from that element. For example, as shown in FIG. 17, a fault handler 1700 on an IOP 1705 cannot directly receive a SYSERR packet generated by an IOP 1710. To account for this, the IPI adapter 1715 on the CE 1720 serves as a SYSERR reflector and echoes a SYSERR produced by IOP 1710 to IOP 1700.

A fault handler 1165 may also be able to probe other system components to obtain error information. In addition, separate fault handlers may communicate with each other to probe the viability of the system components on which they reside, to test the communication paths between the system components, and, assuming that the communication paths are intact, to ensure that each fault handler reaches the same diagnosis in response to a fault event.

A fault handler 1165 groups encountered errors into sets of co-related errors, referred to as syndromes. Syndromes generally indicate a faulty component, or a suspected list of faulty components, with more specificity than individual errors in the syndrome are able to provide.

Each fault handler uses a state table to parse the incoming errors into specific syndromes. Each syndrome represents a state in the table. If possible, the fault handler uses an incoming error to transition the state table to a new state.

Figure 18:
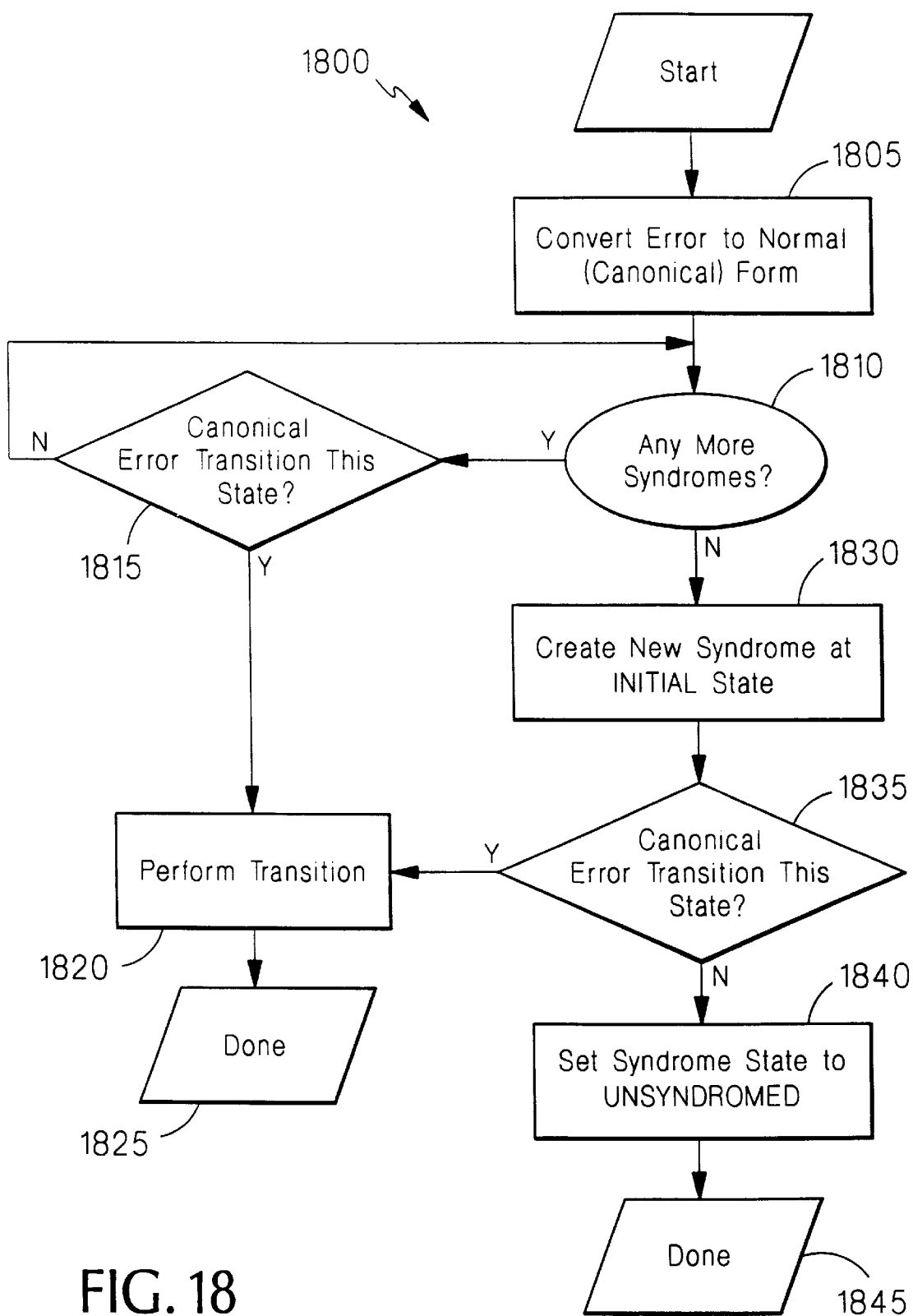
FIG. 18 is a flow chart of a procedure for error processing.

The fault handler processes errors according to the procedure 1800 illustrated in FIG. 18. Initially, the fault handler represents each error as a canonical error by converting the error to a normal form that uniquely identifies the error (step 1805). For example, the fault handler might convert the error to a triplet that includes an error identifier that identifies a particular error, an error target that identifies the subcomponent about which the error is complaining, and a reporting source that identifies the subcomponent that reported the error and the path over which the error was received.

The fault handler then processes the canonical error. First, the fault handler compares the error against states represented by previously established syndromes (step 1810) to see if the error will transition the state of a previously established syndrome (step 1815). If such a transition can be performed, then the fault handler performs the transition (step 1820) and concludes state processing for the error (step 1825). If the error cannot transition any existing syndrome, the fault handler creates a new syndrome at an INITIAL state (step 1830) and determines whether the error can transition the syndrome to a starting state of any syndrome (step 1835). If so, the fault handler performs the transition (step 1820) and concludes state processing for the error (step 1825). If the error is not anticipated by a starting state of a syndrome, the fault handler converts the error to an unsyndromed error (step 1840) and concludes state processing for the error (step 1845). An unsyndromed error is a catch-all for errors that are unanticipated, misreported, or incompletely transmitted or received. For example, if canonical errors are in the triplet form described above, then a canonical unsyndromed error might consist of an identifier for "UNSYNDROMED", an error target corresponding to the reporting source of the bogus error, and a reporting source of the component containing the fault handler.

A set of potential callouts is associated with each state in the state table. When a syndrome transitions to a particular state, the set of callouts is referred to as the callout list of the syndrome.

The state table is a tree-structured list of canonical errors. The tag on each node of the tree is an identifier for a canonical error. Each node points to a list of other errors, or to a list of callouts, or to both.

The state table can be created from a source document that consists of groups of errors (syndromes). The syndrome text syntactically indicates whether one error should occur before another in a syndrome. If no such indication is provided, then the errors are assumed to be unordered. A list of callouts is associated with each syndrome.

The state table is created by permutating each syndrome's errors, converting each error to canonical form, and mapping the syndrome into the table. The terminal node of each permutation points to the callout list for the syndrome. For example, suppose the source table contains the syndromes with associated callouts illustrated in FIG. 19A, and the system topology is assumed to be that of FIG. 17. The "Error" column of FIG. 19A identifies different errors reported to the fault handler in a SYSERR message. In particular, a NAK error indicates excessive retries on a transmit path, an EDC error indicates a low-level protocol failure on a receive path, and on a NAK (echoed) error is a NAK error transmitted by one component and echoed by another. The "Path" column identifies the path on which an error was detected, and the "Received from" column identifies the machine that reported the SYSERR (M1 indicates IOP 1705 (machine 1) and M2 indicates CE 1720 (machine 2)). Finally, the "Callouts" column provides a list of possible failures in the system that could cause the collection of errors listed in the "Error" column.

Using the source table of FIG. 19A for syndrome #1 to be detected by the fault handler, a NAK error reported against path M1–M2 by M1, a NAK error reported against path M1–M2 by M1 echoed from M2, and an EDC error reported against path M1–M2 by M2 must all occur. Then the resulting callout is all of the entries in the "Callout" column for syndrome #1.

The state transition table resulting from the above source would then appear as illustrated in FIG. 19B, where the canonical form error designations are in the triplet form: error(error_path, received_from). The above state transition table is really a tree structure. The root is the "Initial state". Starting from the initial state there are six ways of arriving at a Syndrome #1 callout. There are three required error messages to arrive at a syndrome #1 callout and they can arrive in any possible order (3 factorial=6 possible orderings). Syndrome #2 callouts require two errors in any order (2 factorial=2 possible orderings). Thus a NAK (M1→M2, M1 v. M2) and an EDC (M1→M2, M2) arriving in any order without the third error NAK (M1→M2, M1) produces a syndrome #2 callout. In this case, the existence of the NAK (M1→M2, M1) uniquely identifies syndrome #1.

The state table is constructed by permutating sets of errors and, therefore, can become very large. This is particularly true if the syndromes comprising the table are particularly complex or if there are a large number of system components generating errors. The table size may be reduced by logical to physical mapping. In a system with redundant components, errors reported against one component are indistinguishable (up to unit identification) from errors reported against the redundant set that includes that component. Accordingly, the table size can be reduced by identifying errors and callouts in logical form so that the table is, in effect, reflective of errors corresponding to only one component of a redundant set. With this approach, a mapping of physical to logical identifiers is maintained for each syndrome as the syndrome is constructed. When a canonical error is compared against the errors in a state of a syndrome, the error must be further transformed into a logical canonical form relative to that syndrome. The logical to physical mapping may vary from syndrome to syndrome.

The size of the state table may also be reduced by subtree folding. Many parts of the lower structure of the tree-structured state table are identical to other parts. Identical subtrees can be collapsed into a single copy, even if they originate from different syndromes. Performing this optimization tends to mitigate the explosive growth of the state table as syndrome complexity increases: larger syndromes generate more duplicate subtrees that can be eliminated by subtree folding.

Each syndrome indicates zero, one, or more potential faulty components, or callouts, in the system. The fault handler produces a single diagnosis by combining these indications into an event callout list. Ideally, the callout list includes only a single element that unambiguously identifies a system component or function that failed and precipitated the error event. The callout list may, however, contain more than one element.

The final callout list is formed by taking the intersection of the most-likely callouts associated with each syndrome. Some of the faults indicated by a syndrome are more likely than others. For example, a transmission error may result from a transient point-to-point error, a common transmitter or common receiver fault, cable integrity problems, or incipient power failure on one end. Incipient power failure could explain almost any erroneous behavior. However, without corroborating evidence, a transient fault is a more likely explanation for a single transmission failure than is an incipient power failure. In addition, some faults identify components less specifically and can be presumed to identify more specific components subsumed therein. For example, the callout for one syndrome may specify an interconnect failure between IOP 1705 and CE 1720. This callout would include, for example, the IPI adapters 1715 at both ends of the interconnection as well as the cabling 1725 between them. Another syndrome may indicate a non-specific error on CE 1720 (that is, all hardware and software components of CE 1720, including the IPI adapter 1715 of CE 1720). The combination of the callout lists of these syndromes clearly indicates that the IPI adapter 1715 of CE 1720 is faulty.

Two callouts are combined by selecting a system component that is common to the two callouts, but least encompassing. For any two callouts, there is at least one other callout that contains an intersection of the system components covered by the first two. The product of the combination of callouts is such a component that covers the least part of the system. For example, suppose that in the loosely-connected system shown in FIG. 17 there is a callout against the interconnection of IOP 1705 and CE 1720 and also against the interconnection of IOP 1710 and CE 1720. These interconnections intersect at the IPI adapter 1715 in CE 1720. They also could be considered to intersect at CE 1720, in general. However, the adapter is the callout chosen since this is the least-encompassing component that can be identified as the intersection of the faulty interconnections.

Figure 20:
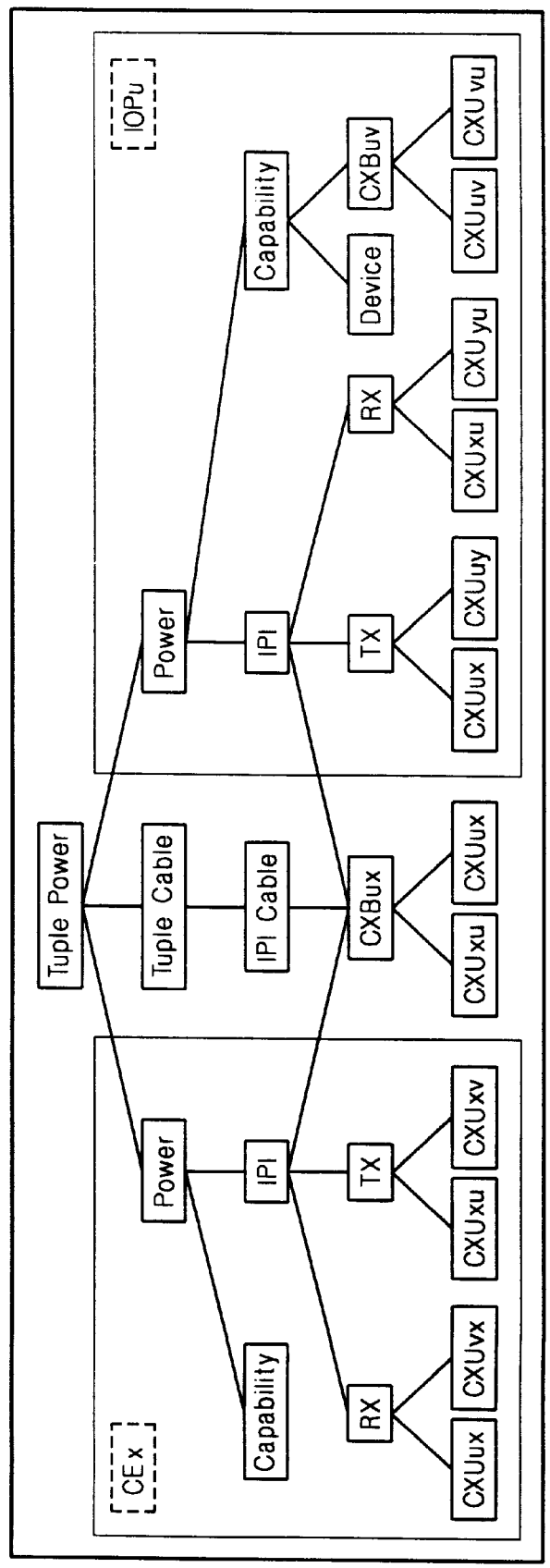
FIG. 20 is a callout hierarchy diagram.

The approach described above for combining callouts results in there being only one product callout for each combination of two other callouts. Accordingly, a "multiplication table" could be established for use by the fault handler in quickly establishing a new callout from any two others. The multiplication table is formed by creating a callout hierarchy diagram such as is illustrated in FIG. 20.

Each box in the diagram represents a callout, and the product of two callouts is defined as the lowest callout (in the hierarchy) common between the two. The exception to this rule is that a callout combined with itself is itself (i.e., all entries are returned instead of the lowest entry). Thus, for example:

CXUux*CXUvx=RX(CEx),
RX(CEX)*TX(CEx)=IPI(CEx),
RX(IOPu)*Capability(IOPu)=Power (IOPu), and
Device(IOPu)*Capability(CEx)=Tuple Power,
while
CXUux*CXUux=CXUux.

NOTE: In the discussions that follow, the abbreviations being used are:

CNux-unidirectional inconnection between Machine u and Machine x

CBux-bidirectional inconnection between Machine u and Machine x

The multiplication table formed by this method can be very large, especially in systems with large numbers of redundant components. Fortunately, it is not necessary to actually form the multiplication table. Rather, the multiplication can be performed by following the same rules for two callouts as would be required in computing the table. All that is required is an instantiation of the directed graph comprising the callout hierarchy diagram. Furthermore, redundant callouts in the system may be eliminated by representing the callouts in logical form. (However, the logical callouts must be mapped to physical callouts when the multiplication is performed.)

The fault handler never combines callouts within a list. Instead, the fault handler combines two callout lists by "cross-multiplying" the lists to form a third list, where the third list contains all unique combinations of the original lists. For example, cross-multiplication of the list 1 and list 2 elements of FIG. 21A would result in the product elements illustrated in FIG. 21B. Eliminating duplicate callouts results in a product list of Common Machine 1/2 Power Supply; Machine 1 Power; Machine 2 Power; Machine 1 Adapter; Machine 2 Adapter; and 1⇌2 Bidirectional Interconnect.

Callout lists from independent sources can be combined in this same manner. For example, suppose that a fault handler 1700 exists on each of IOP 1705 and 1710 in the system shown in FIG. 17. If communication exists between the two fault handlers, then the callout lists from the two fault handlers can be combined into a callout list for the entire system. This combined list will have equal or greater specificity than the callout list from each fault handler standing taken independently.

After all syndrome callout lists are combined, nonsensical callouts are removed from the list. This is done by ranking each callout according to the scope of compromise to system operation that it implies. The final callout list (i.e., the diagnosis) is formed by selecting callouts of only the lowest rank (lower rank is arbitrarily chosen to apply to callouts of lesser scope). For example, with the callout ranking illustrated in FIG. 22, the callout list of FIG. 21B can be reduced to a single callout: Machine 1⇌Machine 2 Bidirectional Interconnect.

The ranking procedure involves a probabilistic assumption. When all else is equal, callouts of lower rank are more probably the cause of a fault event than are callouts of a higher rank. In the above example, it is possible that an incipient power failure in the common power supply between IOP 1700 (machine 1) and CE 1710 (machine 2) evoked the syndromes, but without corroborating evidence (in the form of another syndrome, or another error that would modify one of the existing syndromes) it would be misleading to report this as a callout.

Callouts represent the finest granularity of diagnosis that the fault handler is capable of producing. Generally, callouts are too specific to be of use to service personnel. However, they can be mapped to Field Replaceable Units (or FRUs) that represent the subcomponents of the system that can be identified for service or replacement. For instance, the fault handler may be capable of identifying a common receive port on an interconnect adapter. The FRU corresponding to this callout would be the adapter card.

Figure 23:
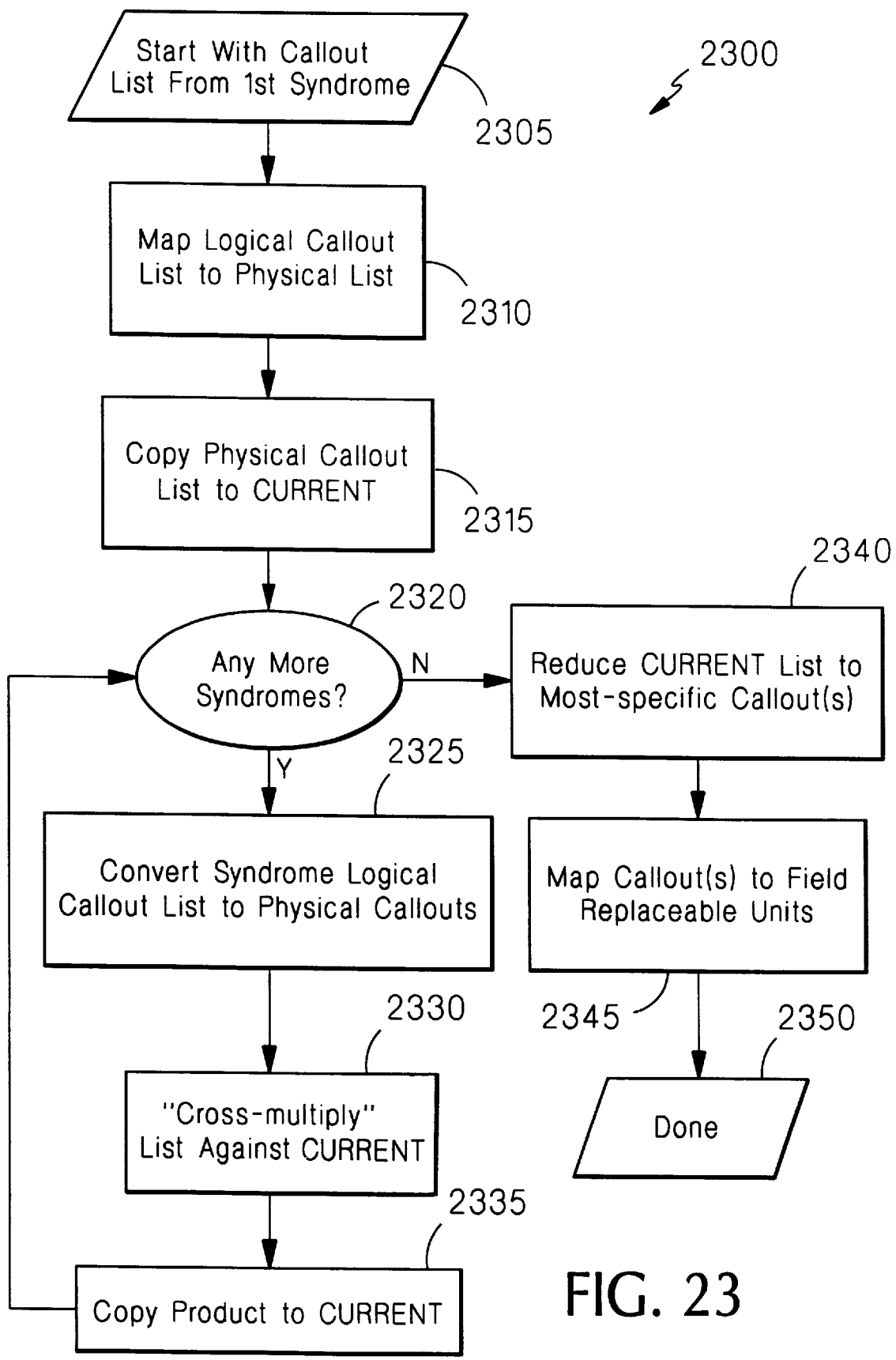
FIG. 23 is a flowchart of a procedure for identifying a faulty component.

In summary, a Fault Handler 1165 identifies a faulty FRU according to the procedure 2300 illustrated in FIG. 23. Starting with the callout list from a first syndrome (step 2305), the Fault Handler 1165 maps the logical callout to a physical list (step 2310). The Fault Handler 1165 then identifies this physical list with the designation CURRENT (step 2315).

If there are more syndromes to process (step 2320), the Fault Handler 1165 converts the logical callout list for the new callout to physical callouts (step 2325), cross-multiplies the list against CURRENT (step 2330) and stores the resulting product as CURRENT (step 2335).

Once all syndromes have been processed (step 2320), the Fault Handler 1165 reduces CURRENT to the most specific callout or callouts (step 2340), maps the callout or callouts to one or more FRUs (step 2345) and concludes the procedure (step 2350).

Other embodiments are within the scope of the following claims.

What is claimed is:

1. A method of handling faults in a computer system, the computer system including computing elements, controllers that provide data from data sources to the computing elements, error reporting elements and error processing elements, the method comprising:

intercepting a request for data by a computing element;

transmitting the intercepted request to the controllers;

having at least one of the controllers respond by transmitting the requested data to the computing element;

detecting, through an error reporting element that comprises a computing element or a controller, an error condition and transmitting information about the error condition as an error message to error processing elements connected to the error reporting element, the error processing elements including at least two of the controllers, and retransmitting the error message, through at least one error processing element, to other error processing elements connected to the at least one error processing element.

2. A method of handling faults in a computer system, the computer system including computing elements, controllers that provide data from data sources to the computing elements, error reporting elements and error processing elements, the method comprising:

intercepting a request for data by a computing element;

transmitting the intercepted request to the controllers;

having at least one of the controllers respond by transmitting the requested data to the computing element;

detecting, through error reporting elements that comprise the computing elements or the controllers, an error condition and transmitting information about the error condition as error messages to error processing elements connected to the error reporting elements, the error processing elements including at least two of the controllers, and combining, through at least one error processing element, information from related error messages from multiple error reporting elements and using the combined information in identifying a source of the error condition.

3. The method of claim 2, wherein the at least one error processing element uses a state table to combine information from related error messages.

4. The method of claim 3, wherein the at least one error processing element represents an error message using an error identifier that identifies a particular error, an error target that identifies a subcomponent that caused the error represented by the error message, and a reporting source that identifies an error reporting element that generated the error message and a path over which the error message was received.

5. The method of claim 3, wherein the error processing element determines whether error messages are related by comparing a received error message against states representing previously received error messages.

6. A computer system including:

computing elements, controllers that provide data from data sources to the computing elements, error reporting elements that include the computing elements, and error processing elements that include at least two of the controllers, wherein:

an error reporting element is configured to detect an error condition and transmit information about the error condition as an error message to error processing elements connected to the error reporting element, and at least one error processing element is configured to retransmit the error message to the other error processing elements connected to the at least one error processing element.

7. A computer system including:

computing elements, controllers that provide data from data sources to the computing elements, error reporting elements that include the computing elements or the controllers, and error processing elements that include at least two of the controllers, wherein:

error reporting elements are configured to detect an error condition as error messages to error processing elements connected to the error reporting elements, and at least one error processing element is configured to combine information from related error messages from multiple error reporting elements and use the combined information in identifying a source of the error condition.

8. The method of claim 2, further comprising retransmitting the error message, through at least one other error processing element, to other error processing elements connected to the at least one other error processing element.

9. The method of claim 2, further comprising determining that an error is associated with a particular error reporting element and a path between the particular error reporting element and the at least one error processing element when the at least one error processing element does not receive an expected error message from the particular error reporting element.

10. The method of claim 2, further comprising the at least one error processing element probing other system components to obtain error information.

11. The method of claim 2, further comprising the at least one error processing element grouping errors into sets of co-related errors.

12. The method of claim 11, wherein a set of co-related errors indicates a faulty component or a suspected list of faulty components with more specificity than any individual error is able to provide.

13. The system of claim 7, wherein the at least one error processing element is configured to use a state table to combine information from related error messages.

14. The system of claim 13, wherein the at least one error processing element is configured to represent an error message using an error identifier that identifies a particular error, an error target that identifies a subcomponent that caused the error represented by the error message, and a reporting source that identifies an error reporting element that generated the error message and a path over which the error message was received.

15. The system of claim 13, wherein the error processing element is configured to determine whether error messages are related by comparing a received error message against states representing previously received error messages.

16. The system of claim 6, wherein the at least one error processing element is configured to retransmit the error message to other error processing elements connected to the at least one error processing element.

17. The system of claim 6, wherein the at least one error processing element is configured to determine that an error is associated with a particular error reporting element and a path between the particular error reporting element and the at least one error processing element when the at least one error processing element does not receive an expected error message from the particular error reporting element.

18. The system of claim 6, wherein the at least one error processing element is configured to probe other system components to obtain error information.

19. The system of claim 6, wherein the at least one error processing element is configured to group errors into sets of co-related errors.

20. The system of claim 19, wherein a set of co-related errors indicates a faulty component or a suspected list of faulty components with more specificity than any individual error is able to provide.

* * * * *